(12) United States Patent
Zhou et al.

(10) Patent No.: US 11,822,219 B2
(45) Date of Patent: Nov. 21, 2023

(54) PROJECTOR

(71) Applicant: Hisense Laser Display Co., Ltd., Shandong (CN)

(72) Inventors: Boyu Zhou, Shandong (CN); Changming Yang, Shandong (CN); Xintuan Tian, Shandong (CN); Wenbang Cai, Shandong (CN); Haijun Yin, Shandong (CN); Jian Zhang, Shandong (CN)

(73) Assignee: HISENSE LASER DISPLAY CO., LTD., Shandong (CN)

( * ) Notice: Subject to any disclaimer, the term of this patent is extended or adjusted under 35 U.S.C. 154(b) by 142 days.

(21) Appl. No.: 17/361,652

(22) Filed: Jun. 29, 2021

(65) Prior Publication Data

US 2021/0325768 A1   Oct. 21, 2021

Related U.S. Application Data

(63) Continuation-in-part of application No. PCT/CN2019/093582, filed on Jun. 28, 2019.

(30) Foreign Application Priority Data

Jun. 6, 2019  (CN) .......................... 201910493103.9
Jun. 14, 2019  (CN) .......................... 201910518126.0
(Continued)

(51) Int. Cl.
G03B 21/14 (2006.01)
H04N 9/31 (2006.01)
G03B 21/20 (2006.01)

(52) U.S. Cl.
CPC ......... *G03B 21/145* (2013.01); *G03B 21/142* (2013.01); *G03B 21/2066* (2013.01)

(58) Field of Classification Search
CPC .................................................. H04N 9/3141
See application file for complete search history.

(56) References Cited

U.S. PATENT DOCUMENTS 9,429,833 B1    8/2016   Satoh et al.

FOREIGN PATENT DOCUMENTS

CN    202327585 U    7/2012
CN    202372745 U    8/2012
(Continued)

OTHER PUBLICATIONS

First Office Action issued in corresponding Chinese Application No. 201910518126.0 dated Mar. 17, 2020, with English translation.
(Continued)

*Primary Examiner* — Ryan D Howard
(74) *Attorney, Agent, or Firm* — Morgan, Lewis & Bockius LLP

(57) ABSTRACT

A projector includes a shell, a light source, an optical machine, a projection lens and an auxiliary positioning device. The light source is configured to provide illumination beams. The optical engine is configured to modulate the illumination beams based on received image signals to obtain projection beams. The projection lens is configured to project the projection beams on a projection plane for imaging. The auxiliary positioning device is connected to the shell and is configured to locate a position the projector. The auxiliary positioning device includes a positioning rod which includes a first end and a second end opposite to the first end; the first end of the positioning rod is connected to the shell, and the second end of the positioning rod is configured to abut against a reference object that is at a fixed position relative to the projection plane.

18 Claims, 14 Drawing Sheets

(30) Foreign Application Priority Data

Jun. 14, 2019 (CN) .......................... 201910518127.5
Jun. 14, 2019 (CN) .......................... 201920898414.9

(56) References Cited

FOREIGN PATENT DOCUMENTS

| CN | 202512358 | U | 10/2012 |
|---|---|---|---|
| CN | 202815406 | U | 3/2013 |
| CN | 105629649 | A | 6/2016 |
| CN | 205608371 | U | 9/2016 |
| CN | 205721035 | U | 11/2016 |
| CN | 107340680 | A | 11/2017 |
| CN | 107885017 | A | 4/2018 |
| CN | 108169987 | A | 6/2018 |
| CN | 208044887 | U | 11/2018 |
| CN | 208154025 | U | 11/2018 |
| CN | 109391712 | A | 2/2019 |
| CN | 208919649 | U | 5/2019 |
| JP | 2000122180 | A * | 4/2000 |
| JP | 2009-244795 | A | 10/2009 |
| JP | 2011-232416 | A | 11/2011 |
| JP | 2017-207576 | A | 11/2017 |
| WO | 2016/154481 | A1 | 9/2016 |

OTHER PUBLICATIONS

Second Office Action issued in corresponding Chinese Application No. 201910518126.0 dated Oct. 10, 2020, with English translation.
First Office Action issued in corresponding Chinese Application No. 201920898414.9 dated Nov. 19, 2019, with English translation.
Second Office Action issued in corresponding Chinese Application No. 201920898414.9 dated Mar. 10, 2020, with English translation.
International Search Report and Written Opinion issued in corresponding International Application No. PCT/CN2019/093582 dated Mar. 4, 2020, with English translation.

\* cited by examiner

622

PROJECTOR

CROSS-REFERENCE TO RELATED APPLICATION

This application is a continuation-in-part of International Application No. PCT/CN2019/093582 filed on Jun. 28, 2019, which claims priority to Chinese Application No. 201910493103.9, filed on Jun. 6, 2019, Chinese Application No. 201910518127.5, filed on Jun. 14, 2019, Chinese Application No. 201920898414.9, filed on Jun. 14, 2019, and Chinese Application No. 201910518126.0, filed on Jun. 14, 2019, which are incorporated herein by reference in their entireties.

TECHNICAL FIELD

The present disclosure relates to the field of projection technologies, and in particular, to a projector.

BACKGROUND

Projectors, especially ultra-short-throw projectors (such as laser TVs, etc.), although are placed near an imaging plane or a projection screen, may still project a large size image on the imaging plane or the projection screen by ultra-short-throw technology.

An obvious advantage of ultra-short throw projectors is that they save a lot of space. Ultra-short-throw projectors may be placed very close to the screens or walls wherever they are used, such as in classrooms, conference rooms, KTVs or living rooms. Therefore, for small classrooms, meeting rooms, KTVs or rooms with limited space, users do not have to worry about insufficient space at all.

For training lecturers and school teachers, there is no need to worry about their eyes being hurt by the projected light when they stand at the front to give presentations or lectures. Therefore, it is helpful to their vision health. For the participants in the training or students, the speaker will not block the light path of the projector, and they may watch the content on the screen better. For families, that the light path of the projector is blocked by the movement of family members in the living room is avoided, which ensures the imaging and viewing effects.

SUMMARY

A projector is provided. The projector includes a shell, a light source, an optical engine, a projection lens and an auxiliary positioning device. The light source is arranged inside the shell and is configured to provide illumination beams. The optical engine is arranged inside the shell and connected to the light source, and is configured to modulate the illumination beams based on received image signals to obtain projection beams. The projection lens is arranged inside the shell and connected with the optical engine, and is configured to project the projection beams on a projection plane for imaging. The auxiliary positioning device is connected to the shell and is configured to locate a position of the projector. The auxiliary positioning device includes a positioning rod, and the positioning rod includes a first end and a second end opposite to the first end; the first end of the positioning rod is connected to the shell, and the second end of the positioning rod is configured to abut against a reference object at a fixed position relative to the projection plane.

BRIEF DESCRIPTION OF THE DRAWINGS

In order to describe technical solutions in the present disclosure more clearly, the accompanying drawings to be used in the description of some embodiments of the present disclosure will be introduced briefly. Obviously, the accompanying drawings to be described below are merely accompanying drawings of some embodiments of the present disclosure, and a person of ordinary skill in the art can obtain other drawings according to these drawings. In addition, the accompanying drawings in the following description can be regarded as schematic diagrams, and are not limitations on actual dimensions of products and actual processes of methods involved in the embodiments of the present disclosure.

DETAILED DESCRIPTION

Figure 1:
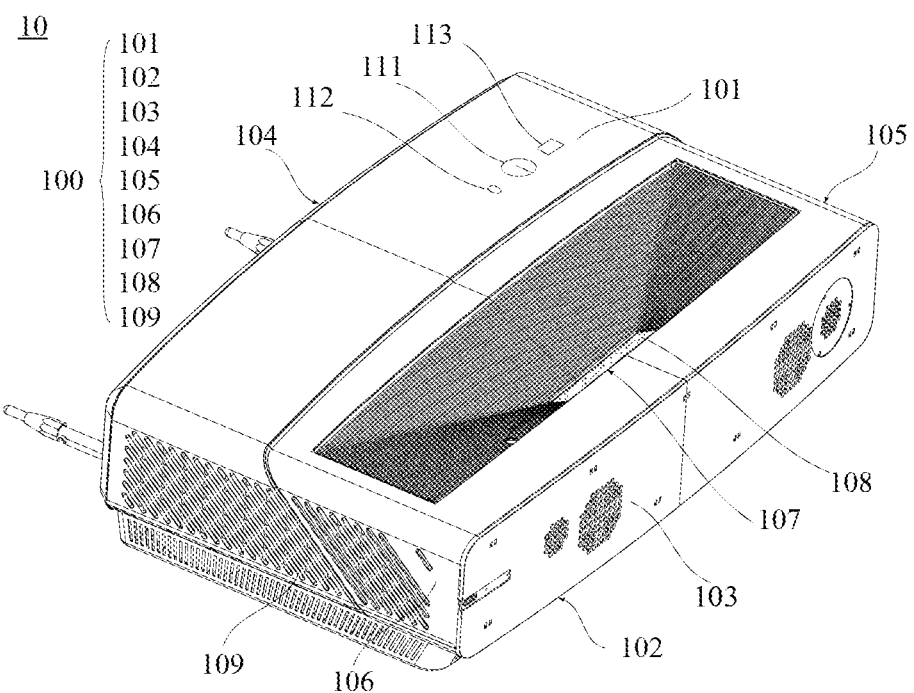
FIG. 1 is a diagram of an outer contour of a projector in accordance with some embodiments.

The technical solutions in embodiments of the present disclosure will be described clearly and completely with reference to the accompanying drawings. Obviously, the described embodiments are merely some but not all of embodiments of the present disclosure. All other embodiments obtained on the basis of the embodiments of the present disclosure by a person of ordinary skill in the art shall be included in the protection scope of the present disclosure.

Unless the context requires otherwise, throughout the specification and the claims, the term "comprise" and other forms thereof such as the third-person singular form "comprises" and the present participle form "comprising" are construed as being open and inclusive, meaning "including, but not limited to." In the description, the terms such as "one embodiment", "some embodiments", "exemplary embodiments", "example", "specific example" or "some examples" are intended to indicate that specific features, structures, materials or characteristics related to the embodiment(s) or example(s) are included in at least one embodiment or example of the present disclosure. Schematic representations of the above terms do not necessarily refer to the same embodiment(s) or example(s). In addition, the specific features, structures, materials, or characteristics described herein may be included in any one or more embodiments or examples in any suitable manner.

Hereinafter, the terms "first" and "second" are used for descriptive purposes only, and are not to be construed as indicating or implying the relative importance or implicitly indicating the number of indicated technical features. Thus, features defined as "first" and "second" may explicitly or implicitly include one or more of the features. In the description of the embodiments of the present disclosure, the term "a plurality of" means two or more unless otherwise specified.

In the description of some embodiments, the term "coupled" and "connected" and their extensions may be used. For example, the term "connected" may be used in the description of some embodiments to indicate that two or more components are in direct physical or electrical contact with each other. For another example, the term "coupled" may be used in the description of some embodiments to indicate that two or more components are in direct physical or electrical contact. However, the term "coupled" or "communicatively coupled" may also mean that two or more components are not in direct contact with each other, but still cooperate or interact with each other. The embodiments disclosed herein are not necessarily limited to the contents herein.

It will be understood that, in the description of some embodiments of the present disclosure, orientations or positional relationships indicated by the terms "center", "upper", "lower", "front", "rear", "left", "right", "vertical", "horizontal", "top", "bottom", "inner", "outer", etc. are based on orientations or positional relationships shown in the drawings, merely to facilitate and simplify the description of the present disclosure, but not to indicate or imply that the referred devices or elements must have a particular orientation, or must be constructed or operated in a particular orientation. Therefore, these terms should not be construed as limitations to the present disclosure.

The use of "adapted to" or "configured to" herein is meant as open and inclusive language that does not foreclose devices adapted to or configured to perform additional tasks or steps.

The term "approximately", "substantially" or "about" as used herein includes a stated value and an average value within an acceptable range of deviation of a particular value determined by a person of ordinary skill in the art, considering measurement in question and errors associated with measurement of a particular quantity (i.e., limitations of a measurement system).

The ultra-short-throw projector is placed near an imaging plane or a projection screen, it may still project a large size image on the imaging plane or the projection screen. Therefore, the ultra-short-throw projector is generally close to the imaging plane or projection screen. Once the ultra-short-throw projector is slightly shifted, the lens in the ultra-short-throw projector will also shift, thereby causing an image projected on the imaging plane or projection screen to shift. A degree of the shift for the projected image will be greater than a shift for a projected image when the ultra-short-throw projector is replaced by a long-throw projector, and in severe cases, the image projected on the imaging plane or projection screen will be distorted.

At present, many ultra-short-throw projectors, such as laser TVs, are configured to be placed directly on a desktop in a state of lacking good positioning, which makes the ultra-short-throw projectors prone to shift. Moreover, since a slight offset of the ultra-short-throw projector will cause a large offset of the projected image, it is difficult to re-adjust and re-position the ultra-short-throw projector.

Some embodiments of the present disclosure provide a projector. The projector includes a positioning rod arranged on a shell thereof, and a length of the positioning rod is adjustable. After adjusting the position of the projector and making the projector project a suitable projected image, it may be considered that the projector is suitable at that position. Furthermore, a length of the positioning rod is adjusted so that the positioning rod extends in a positioning direction and abuts against a reference object whose position is fixed when comparing with the projection plane where the projected image is located. The reference object may be, for example, a wall on which the projected image is projected, another wall opposite to the wall, or other reference objects that are fixed in position relative to the wall. If the projector further includes a projection screen or curtain, the reference object may be a support for hanging the projection screen or curtain, or a wall opposite to the support, or other reference objects fixed in position relative to the support.

After the positioning rod abuts against the reference object at a fixed position relative to the projection plane, a mark is set at the position on the reference object where the positioning rod abuts against the same. The mark may be, for example, a stickable positioning label carried with the projector or a mark drawn with a marker. Lock the length of the positioning rod. In the future, when the projector moves, the positioning rod may be extended in the positioning direction again to the locked length. The position of the projector may be adjusted so that the positioning rod again abuts against the position where the mark is provided on the reference object. Then the determination of location of the projector may be realized.

The projector provided by some embodiments of the present disclosure has an auxiliary positioning device. The auxiliary positioning device is, for example, a positioning rod. The auxiliary positioning device may realize the rapid restoration positioning of the projector. It has a good auxiliary effect for the rapid restoration positioning of the ultra-short-throw projector whose position is not fixed. However, the projectors provided by some embodiments of the present disclosure are not limited to only ultra-short-throw projectors, and may also be other projectors, such as long-throw projectors, short-throw projectors, etc., under the same or similar working principles.

The following will take an ultra-short-throw projector as an example to describe in detail the auxiliary positioning device in the projector and its working principle.

Figure 9A:
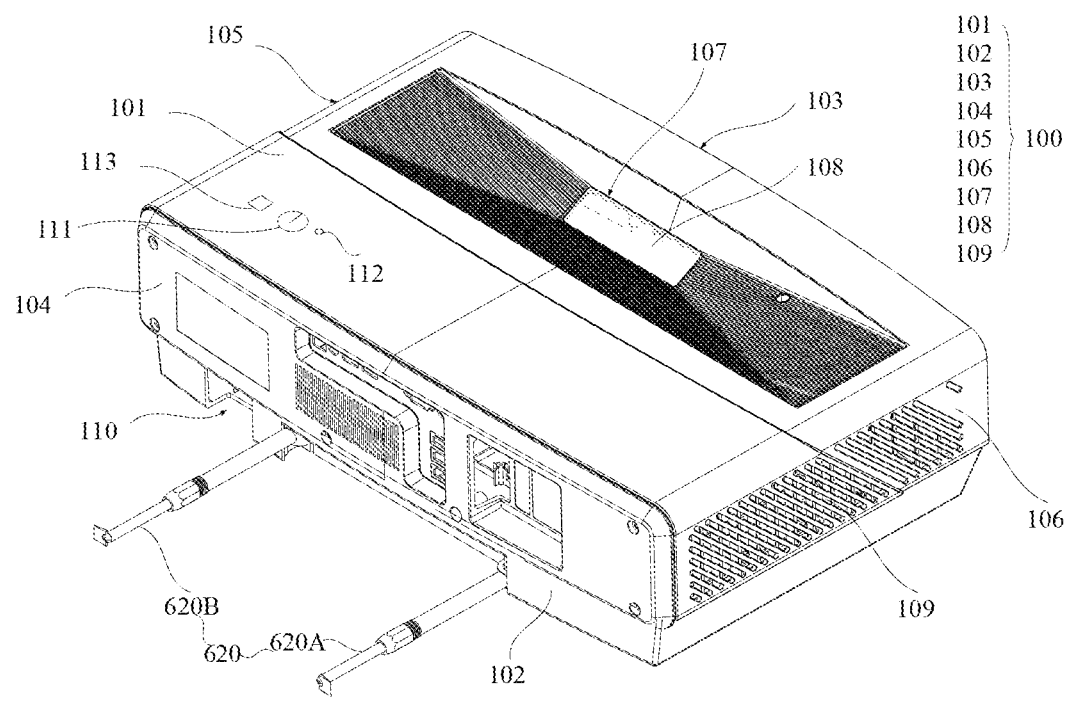
FIG. 9A is a perspective view of yet another projector in accordance with some embodiments.
Figure 9B:
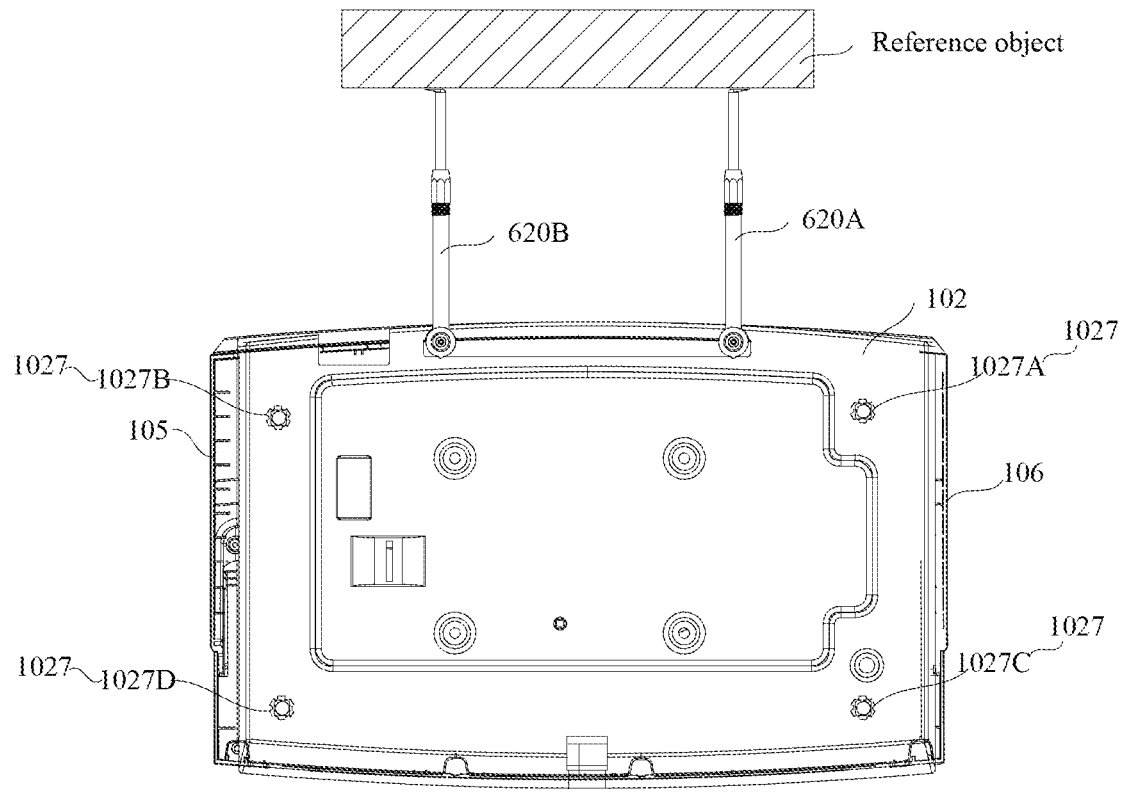
FIG. 9B is a bottom view of a projector shown in FIG. 9A.
Figure 9C:
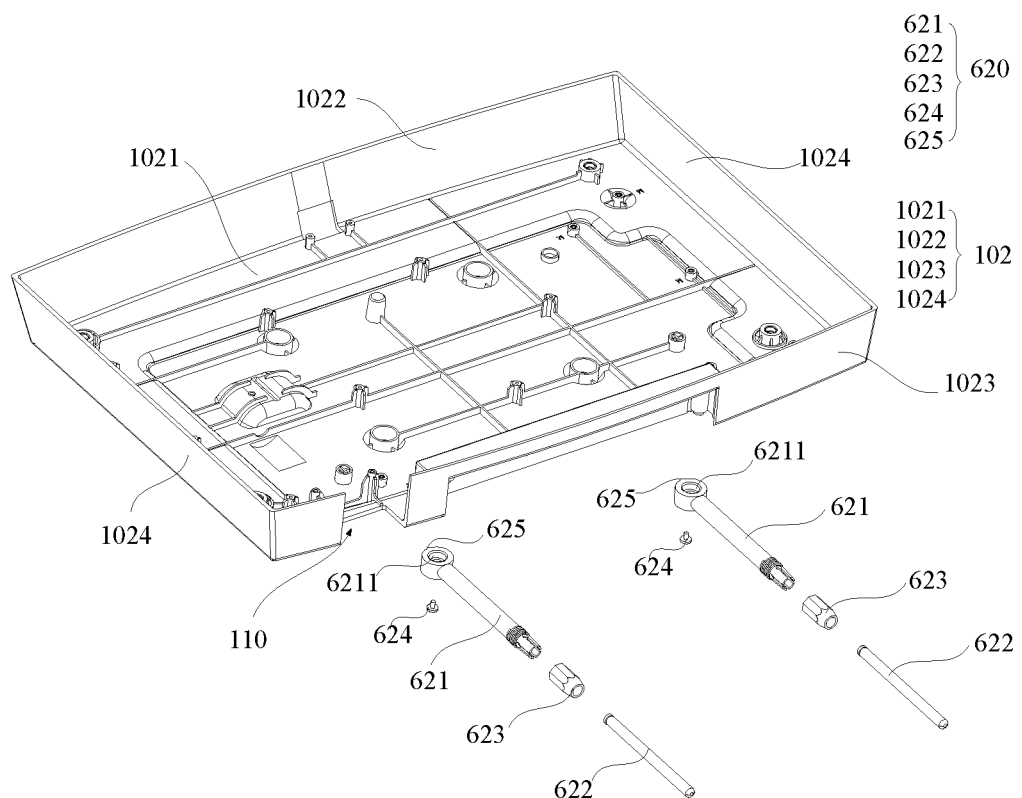
FIG. 9C is an exploded view of a lower shell and positioning rods of a projector shown in FIG. 9A.

As shown in FIGS. 1 and 9C, some embodiments of the present disclosure provide a projector 10. The projector 10 includes a shell 100 that is substantially a rectangular parallelepiped. The shell 100 includes an upper shell 101, a lower shell 102, a front shell 103, a rear shell 104, a left shell 105, and a right shell 106. The lower shell 102 includes a bottom plate 1021, a front plate 1022 and a back plate 1023 arranged opposite to each other, and two side plates 1024 arranged opposite to each other (refer to FIG. 9C for this structure).

In some embodiments, at least one of the upper shell 101, the lower shell 102, the front shell 103, the rear shell 104, the left shell 105, and the right shell 106 may be a separate piece, or may form an integrated structure with one or more other shells (for example, the lower shell 102, the left shell 105 and the right shell 106 are in an integral structure), or may be composed of two or more parts (for example, the upper shell 101 may be spliced together by two or more parts).

The shell 100 further includes a projection hole 107 and a transparent cover 108 covering the projection hole 107. The projection hole 107 and the transparent cover 108 are configured to let the projection beam inside the shell 100 travel out. In some embodiments, the projection hole 107 and the transparent cover 108 are provided on the upper shell 101, the front shell 103, or the rear shell 104 of the projector 10, and the present disclosure is not limited to such a configuration. In the projector 10 shown in FIG. 1, the projection hole 107 and the transparent cover 108 are provided on the upper shell 101 of the projector 10.

The shell 100 includes a plurality of through holes 109. The plurality of through holes 109 are configured to inhale or exhaust, so as to realize air circulation between the inside and outside of the shell 100, thereby promoting heat dissipation of a heat-generating component inside the shell 100. In some embodiments, the through holes 109 may be provided on the left shell 105, the right shell 106, the lower shell 102, or the rear shell 104. The disclosure does not limit thereto.

In some embodiments, the shell 100 further includes a power button 111, and the power button 111 is configured to turn on or turn off power of the projector 10.

In some embodiments, the shell 100 further includes a power indicator 112, and the power indicator 112 is configured to indicate whether the projector 10 is powered on.

In some embodiments, the shell 100 further includes a projection switch 113, and the projection switch 113 is configured to turn on or turn off a projection function of the projector 10.

Figure 5A:
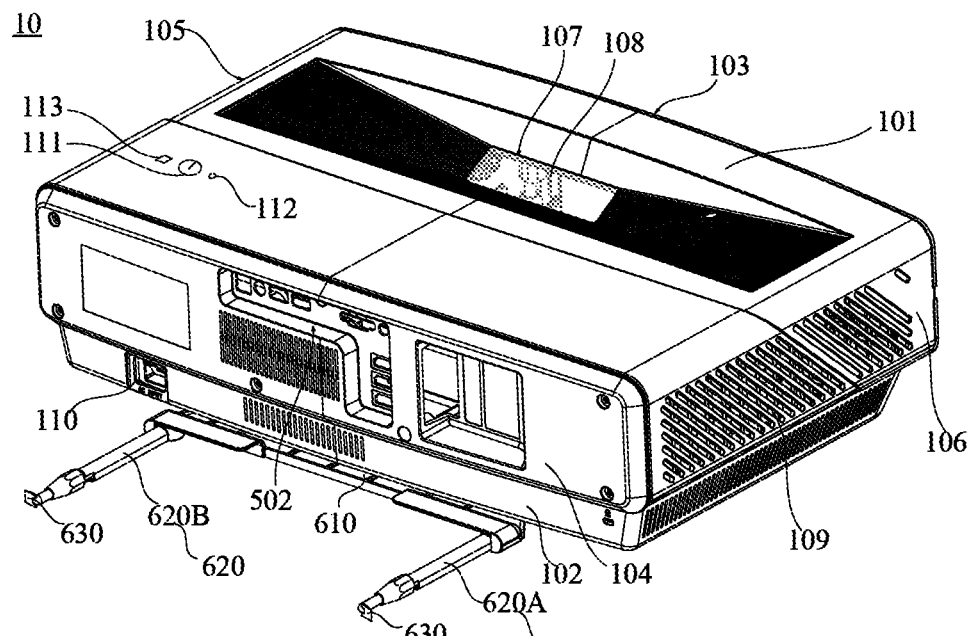
FIG. 5A is a perspective view of a projector in accordance with some embodiments.

As shown in FIG. 5A, in some embodiments, the projector 10 further includes a socket 110 configured to connect a plug of a power adapter. The socket 110 is arranged on the shell 100. For example, the socket 110 may be arranged on the lower shell 102 or the rear shell 104, which is not limited in the present disclosure. FIG. 5A shows that the socket 110 is disposed on the back plate 1023 of the lower shell 102.

Figure 2:
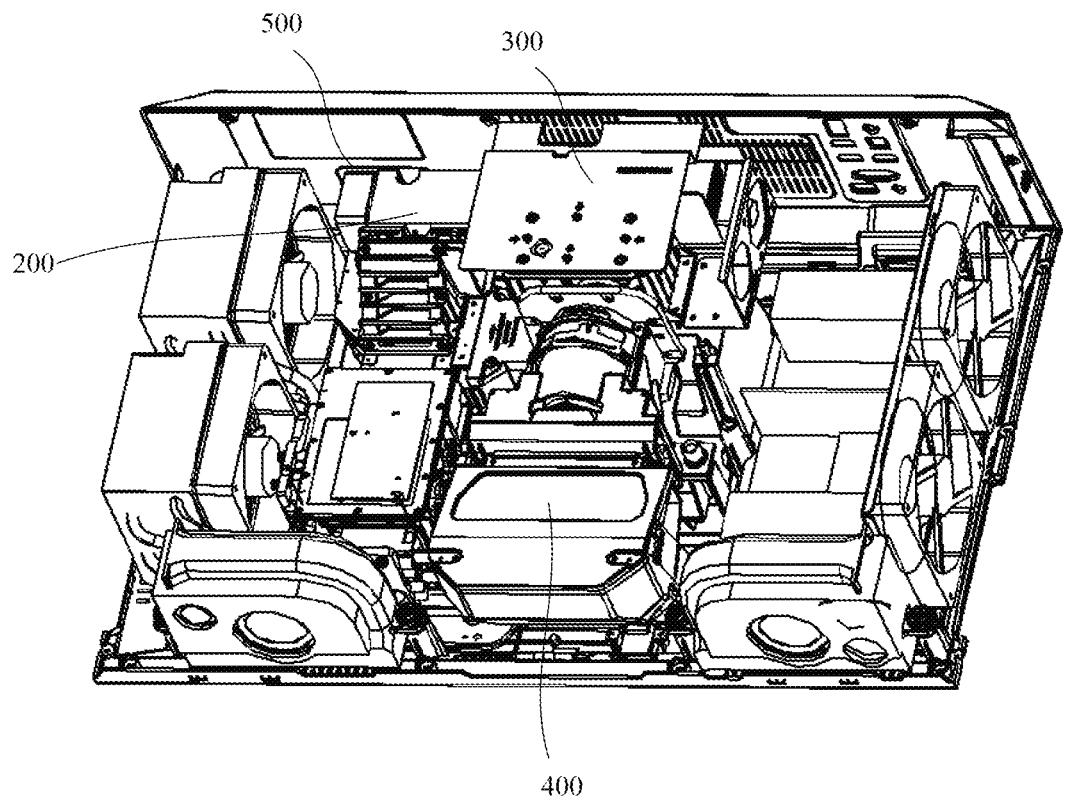
FIG. 2 is a diagram of an internal structure of a projector in accordance with some embodiments.

As shown in FIG. 2, the projector 10 further includes a light source 200, an optical engine 300 and a projection lens 400 arranged inside the shell 100. The light source 200 is configured to provide illumination beams (laser beams). The optical engine 300 is configured to modulate the illumination beams provided by the light source 200 to obtain projection beams with the help of image signals received by an input/output interface 502 (to be described later). The lens 400 is configured to project the projection beams on a screen or a wall for imaging. The light source 200, the optical engine 300, and the projection lens 400 are sequentially connected in a propagation direction of the beams, and are each wrapped by a corresponding housing. The housings of the light source 200, the optical engine 300 and the projection lens 400 support their optical components respectively and make the optical components meet certain sealing or airtight requirements. For example, the light source 200 is hermetically sealed through its housing, which may well solve a light attenuation problem of the light source 200.

In some embodiments, as show in FIG. 2, the light source 200, the optical engine 300, and the projection lens 400 are connected in an "L" shape. On one hand, such a connection structure may adapt to characteristics of a beam path of a reflective light valve in the optical engine 300; and on another hand, it is also conducive to shortening a length of a beam path in a one-dimensional direction, which is in turn helpful for structural arrangement of the entire apparatus. For example, in a case where the light source 200, the optical engine 300, and the projection lens 400 are disposed in the one-dimension direction, the length of the beam path in this direction is long, which is not conducive to the structural arrangement of the entire apparatus.

In some embodiments, the light source 200 may periodically provide red, green, and blue light beams or red, green, blue, and yellow light beams.

In the case where the light source 200 sequentially outputs red, green and blue light beams, the light source 200 may be a mono-color laser light source, a dual-color laser light source, or a tri-color laser light source. On this basis, the light source 200 may include only a blue laser array; or, a blue laser array and a red laser array; or, a blue laser array, a red laser array and a green laser array. When the light source 200 only includes a blue laser array, the light source 200 also includes a phosphor wheel. A blue laser beam hits the phosphor wheel to generate a green fluorescent beam or a red fluorescent beam. When the light source 200 only includes a blue laser array and a red laser array, the light source 200 may also include a phosphor wheel, and the blue laser beam hits the phosphor wheel to produce only a green fluorescent beam.

In the optical engine 300, an optical modulator (or a light valve) is a core component, which plays a role of modulating the illumination beams provided by the light source 200 through the image signals. That is to say, the optical modulator controls the illumination beams to display different colors and luminance according to different pixels of an image to be displayed, so as to finally form an optical image. Depending on whether the optical modulator (or the light valve) transmits or reflects the illumination beams, the optical modulator (or the light valve) may be classified as a transmissive optical modulator (or light valve) or a reflective optical modulator (or light valve). For example, a digital micro-mirror device (DMD) reflects the illumination beams, which thus is a reflective optical modulator. A liquid crystal light valve transmits the illumination beams, and thus the liquid crystal light valve is a transmissive optical modulator.

Figure 3A:
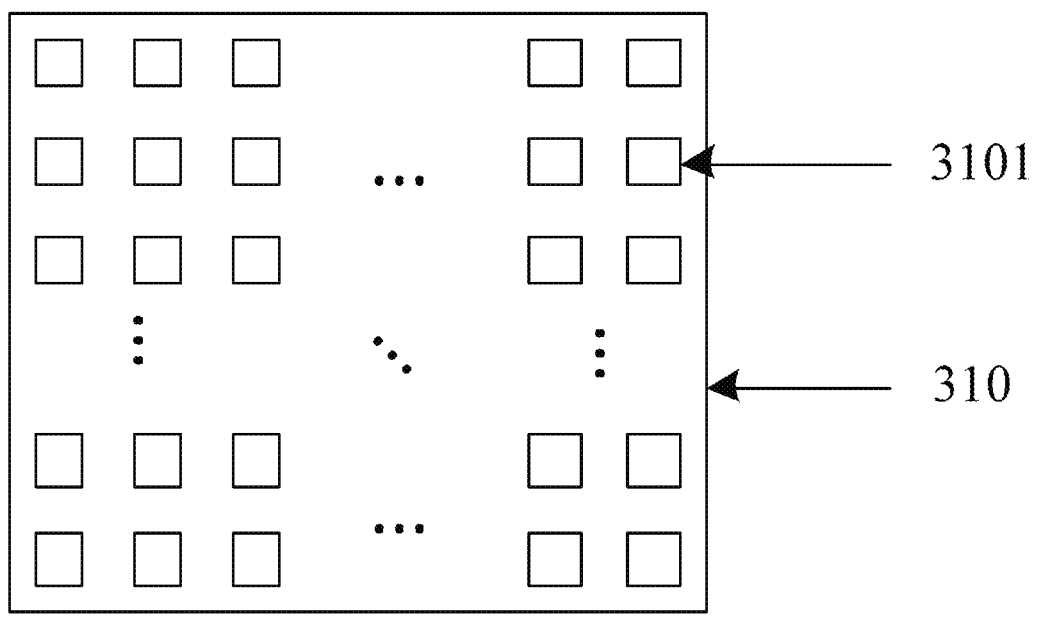
FIG. 3A is a diagram showing an arrangement of micromirrors in a digital micro-mirror device, in accordance with some embodiments.

As shown in FIG. 3A, the digital micro-mirror device (DMD) 310 includes thousands of micro-mirrors 3101 that may be individually driven to deflect. These micro-mirrors 3101 are arranged in an array, and each micro-mirror 3101 corresponds to one pixel in the image to be displayed.

Figure 3B:
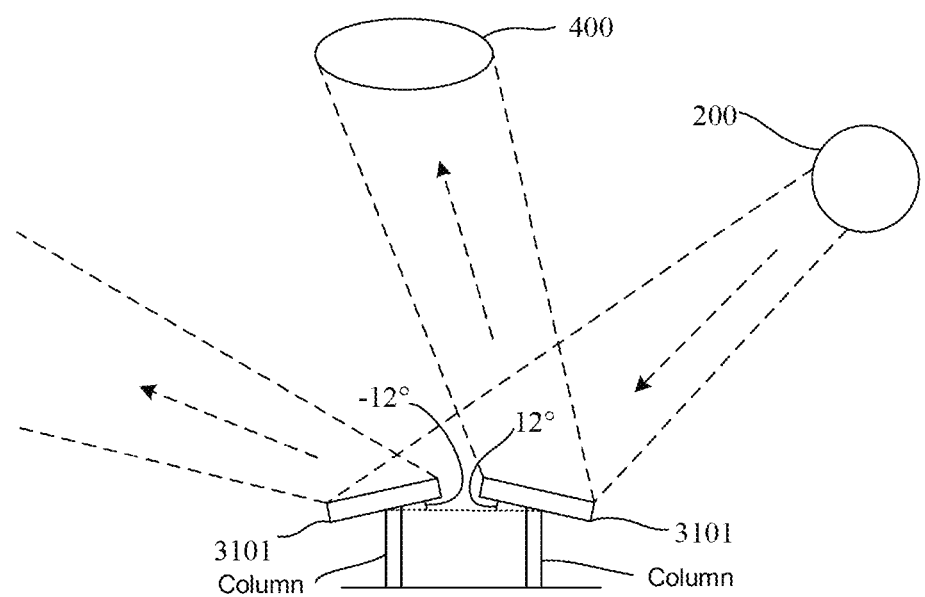
FIG. 3B is a diagram showing operation of a micromirror, in accordance with some embodiments.

As shown in FIG. 3B, each micro-mirror 3101 is equivalent to a digital switch. The micro-mirror may swing by a range of plus or minus 12 degrees (i.e., ±12°) or a range of plus or minus 17 degrees (i.e., ±17°) under action of an external electric field. For example, fora micro-mirror 3101 with a deflection angle of ±12°, a state at +12° is an ON state, and a state at −12° is an OFF state. For a deflection angle between −12° and +12°, it is not used in practice, and actual operation states of the micro-mirror 3101 are only the ON state and the OFF state.

As shown in FIG. 3B, the ON state of the micro-mirror 3101 is a state that the micro-mirror 3101 is in and may be maintained when the illumination beams emitted by the light source 200 may enter the projection lens 400 after being reflected by the micro-mirror 3101. The OFF state of the micro-mirror 3101 is a state that the micro-mirror 3101 is in and may be maintained when the illumination beams emitted by the light source 200 does not enter the projection lens 400 after being reflected by the micro-mirror 3101.

In a display cycle of a frame image, part or all of the micro-mirrors 3101 are switched once between the ON state and the OFF state, so that gray scales of the pixels in the frame image are achieved according to durations of the micro-mirrors 3101 in the ON state and the OFF state. For example, in a case where the pixels have 256 gray scales from 0 to 255, micro-mirrors corresponding to the gray scale 0 are each in the OFF state in an entire display cycle of a frame image, micro-mirrors corresponding to the gray scale 255 are each in the ON state in the entire display cycle of the frame image, and micro-mirrors corresponding to the gray scale 127 are each in the ON state for a half of time and in the OFF state for the other half of the time in the display cycle of the frame image. Therefore, by controlling a state that each micro-mirror in the DMD 310 is in and a duration of each state in the display cycle of a frame image through the image signals, luminance (a gray scale) of a pixel corresponding to the DMD 310 may be controlled, and a purpose of modulating the illumination beams projected onto the DMD 310 may be achieved.

The projection lens 400 includes a combination of a plurality of lens, which are usually divided by group, such as a three-segment combination including a front group, a middle group and a rear group, or a two-segment combination including a front group and a rear group. The front group is a lens group proximate to a laser-emitting side of the projector 10, and the rear group is a lens group proximate to a laser-emitting side of the optical engine 300. The projection lens 400 may be a zoom projection lens, or a prime projection lens whose focus is adjustable, or a prime projection lens. In some embodiments, the projector 10 is an ultra-short-focus projection apparatus. The projection lens 400 is an ultra-short-focus projection lens, and a projection ratio of the projection lens 400 is usually less than 0.3, such as 0.24.

The projection beams formed by the optical engine 300 modulating the illumination beams provided by the light source 200 are incident on the projection lens 400. The plurality of lens in the projection lens 400 include at least one movable lens group 410, which may be adjusted by a lens motor 420 for zoom operation or focus operation. The projection beams pass through various optical lenses of the movable lens group 410, and finally project an image through the projection hole 107 and the transparent cover 108 in the shell 100 of the projector 10.

In some embodiments, the projector 10 further includes a projection screen (not shown). The light passing through the projection hole 107 and the transparent cover 108 in the shell 100 of the projector 10 is projected on the projection screen, and an image is formed on the projection screen.

In some embodiments, the projector 10 is not provided with the projection screen, and the light passing through the projection hole 107 and the transparent cover 108 in the shell 100 of the projector 10 is projected on a wall or a surface of other object for imaging.

Figure 4:
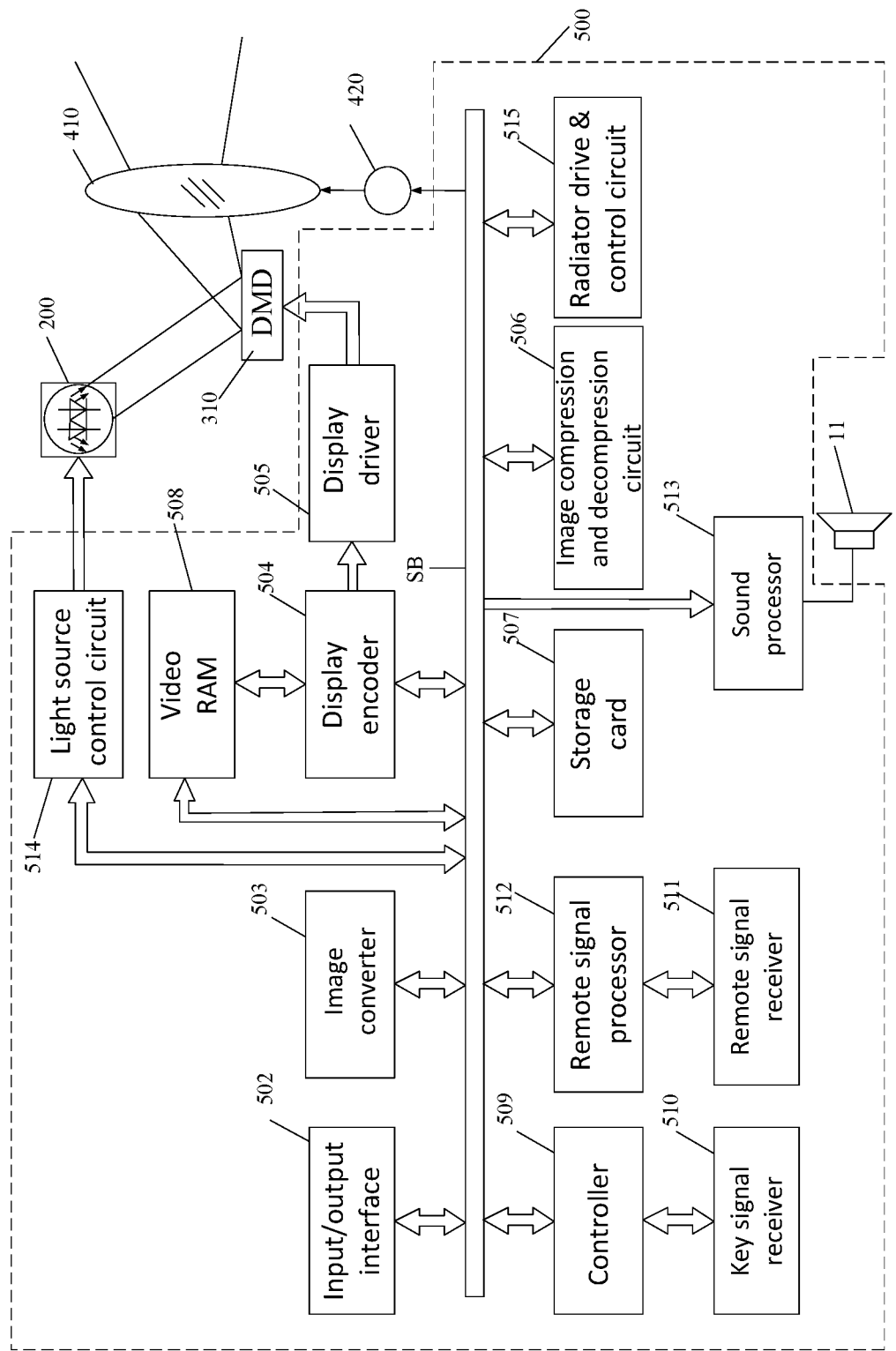
FIG. 4 is a diagram showing a structure of a main circuit board of a projector in accordance with some embodiments.

As shown in FIG. 4, in some embodiments, the projector 10 further includes a main circuit board 500, which includes an input/output interface 502, an image converter 503, a display encoder 504, a video RAM 508, and a display driver 505 and so on.

The input/output interface 502 includes a USB interface (Universal Serial Bus), a D-Sub interface, an S-Video, an RCA connector, and the like. D-Sub interface is the abbreviation of D-subminiature. Because the shape of the interface looks like a capital letter D, it is called D-Sub. D-Sub interface is also called VGA (Video Graphics Adapter) interface. The full name of S-Video is Separate Video. The S-Video separates and transmits the brightness information and chrominance information in an image signal, avoiding the mutual interference between the brightness information and chrominance information when the two are mixed and transmitted. In the RCA connector, RCA is an acronym for Radio Corporation of American, because the RCA connector was invented by this company. The RCA connector is used to transmit video signals and audio signals.

In the projection mode, image signals of various specifications input from the input/output interface 502 are transmitted to the image converter 503 via a system bus SB.

The image converter 503 converts image signals of various specifications into image signals having a predetermined format suitable for display, and outputs the image signals having a predetermined format to the display encoder 504.

The display encoder 504 is configured to generate video signals according to the image signals having a predetermined format, and output the video signals to the display driver 505.

The display driver 505 drives the digital micro-mirror device (DMD) 310 at an appropriate frame rate according to the video signals received from the display encoder 504. Meanwhile, the illumination beams emitted from the light source 200 also arrive at the digital micro-mirror device 310. The digital micro-mirror device 310 selectively reflects the illumination beams according to the received video signals, thereby modulating the illumination beams into projection beams. The projection beams are projected on a screen or a wall (not shown) via the projection lens 400 to display an image.

The movable lens group 410 in the projection lens 400 performs zoom adjustment or focus adjustment by the lens motor 420, thereby projecting a clear image on a screen or a wall not shown.

In the replay mode, an image compression and decompression circuit 506 performs data compression on the brightness information and chrominance information of the image signals with a predetermined format through encoding processing, and writes these information into a storage card 507 which is a nonvolatile readable and writable recording medium.

In addition, the image compression and decompression circuit 506 may read the above-mentioned information recorded in the storage card 507 during replay, and decompress the information. The decompressed information is read to the video RAM 508 through the system bus SB. The display encoder 504 reads the decompressed information from the video RAM 508, generates video signals according to the decompressed information, and then outputs the video signals to the display driver 505. The display driver 505 drives the digital micro-mirror device (DMD) 310 at an appropriate frame rate according to the received video signals to modulate the illumination beams emitted by the light source 200 into projection beams. The projection beams are projected on a screen or a wall (not shown) via the projection lens 400 to display an image.

A controller 509 controls every operation of the projector 10. For example, the controller 509 may be composed of a CPU, a ROM storing various setting programs, a RAM used as a memory, and the like.

The controller 509 receives a key operation signal transmitted by a key signal receiver 510. The key signal receiver 510 receives key operation signals sent by the power button 111 and the projection switch 113 in the shell 100.

The controller 509 receives a key operation signal from a remote controller. The key operation signal from the remote controller is first received by a remote signal receiver 511 through IR (Infrared Radiation) or Wi-Fi (Wireless Fidelity), and then demodulated into a code signal by the remote signal processor 512. The code signal is output to the controller 509 through the system bus SB.

The controller 509 is connected to a sound processor 513 via the system bus SB. The sound processor 513 includes a sound source circuit, which processes sound data and drives the speaker 11 to play sound in the projection mode and the replay mode.

In addition, the controller 509 controls a light source control circuit 514. The light source control circuit 514 controls the light source 200 to sequentially transmit various primary colors of light. For example, the light source control circuit 514 controls the current or voltage of active light-emitting elements such as lasers or diode light-emitting devices, so that these active light-emitting elements emit light of various primary colors sequentially. The light source control circuit 514 also controls current or voltage of a control circuit of the phosphor wheel or a color filter wheel that may be present in the light source 200, so that the rotation speed of the phosphor wheel or the color filter wheel matches the light-emitting timing of the aforementioned active light-emitting elements.

In addition, the controller 509 controls a radiator drive & control circuit 515 to control the operating state of the radiator. For example, control the rotation speed of a cooling fan, or control working current or working voltage of a TEC (Thermoelectric Cooler). The projector 10 includes a plurality of temperature sensors to detect temperature of the light source 200 and the like. The controller 509 controls the radiator drive & control circuit 515 based on the result of the temperature detection.

It should be noted that the circuit structure in the main circuit board 500 may be divided into the above-mentioned different modules (for example, the image converter 503, the display encoder 504, etc.) according to different functions. Each function may correspond to one module. Two or more functions may also be integrated into one module. The above-mentioned different modules may be implemented in the form of hardware or software. It should also be noted that the division of the above-mentioned different modules is illustrative, and is only a logical function division, and there may be other division methods in the actual circuit structure of the main circuit board 500.

Figure 5B:
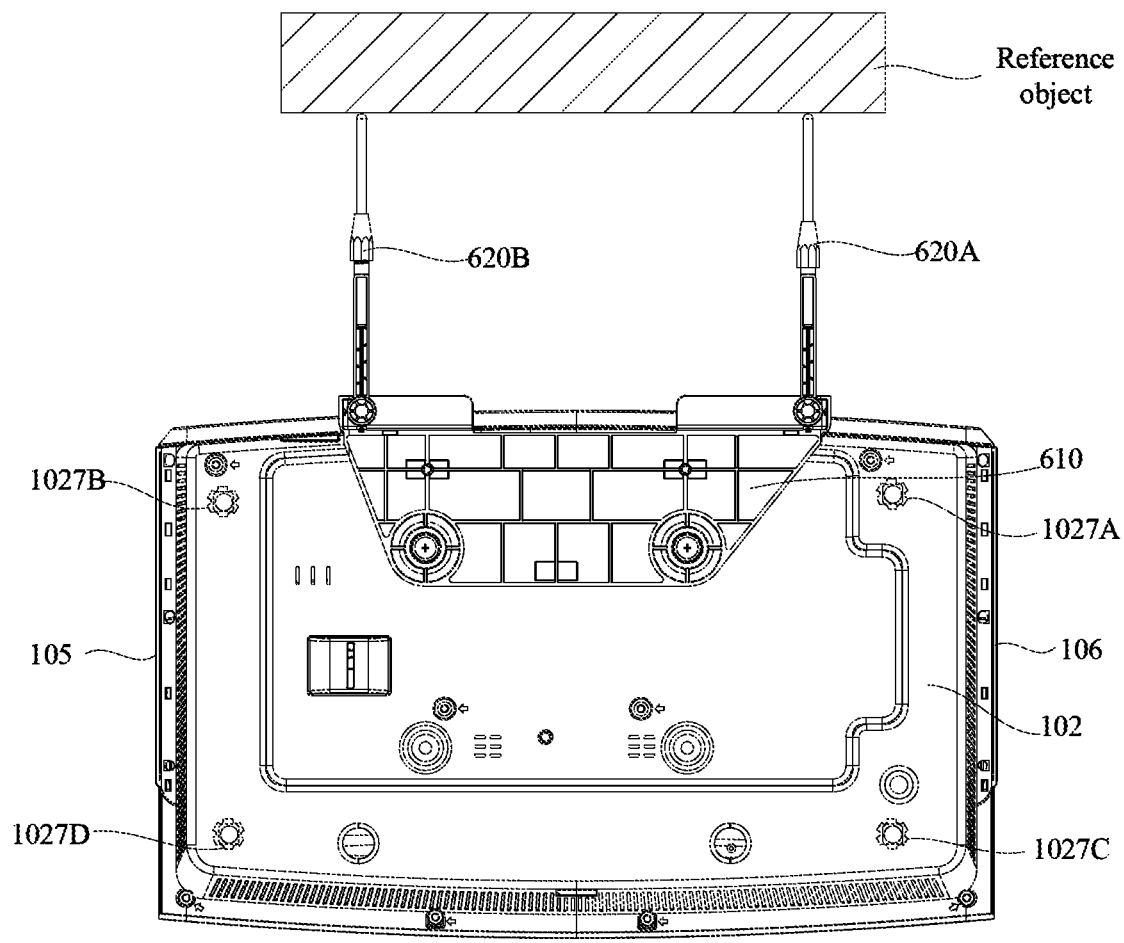
FIG. 5B is a bottom view of the projector shown in FIG. 5A.
Figure 5C:
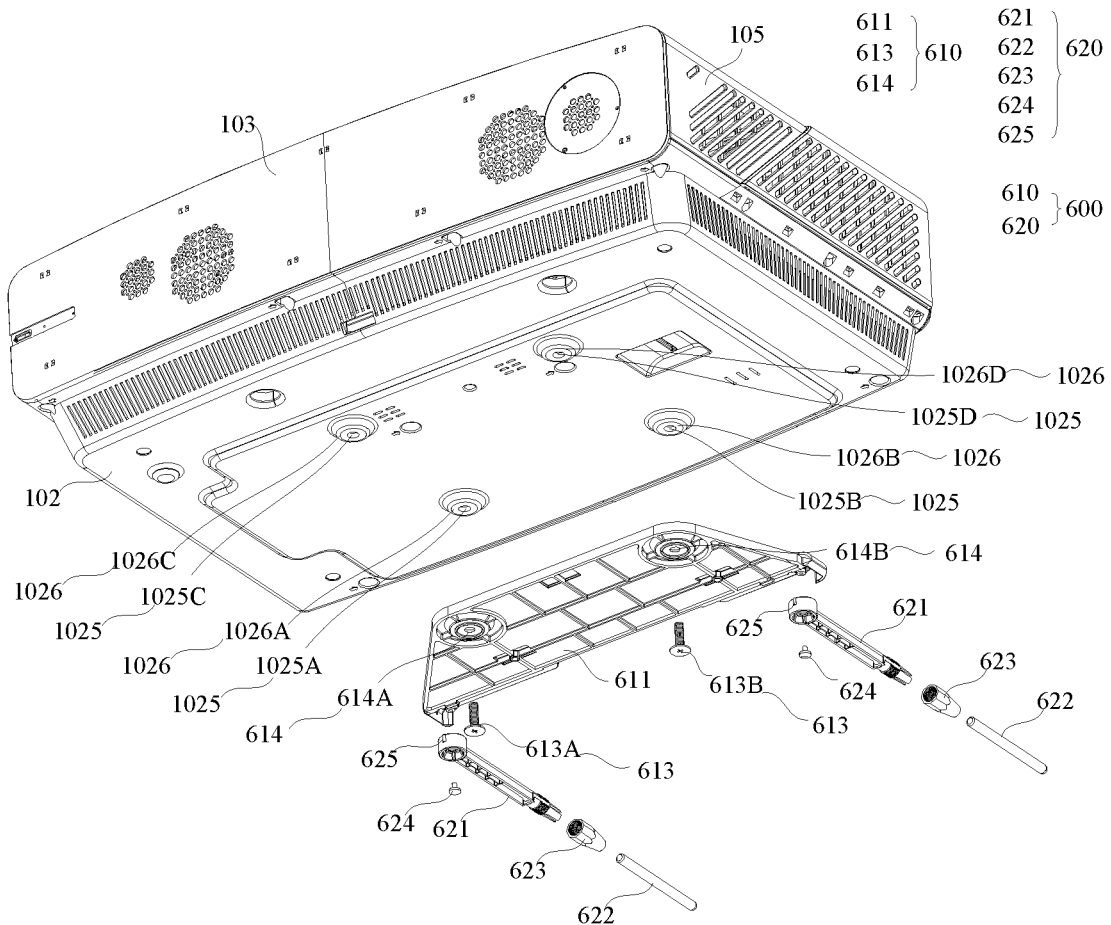
FIG. 5C is an exploded view of the projector shown in FIG. 5A.
Figure 5D:
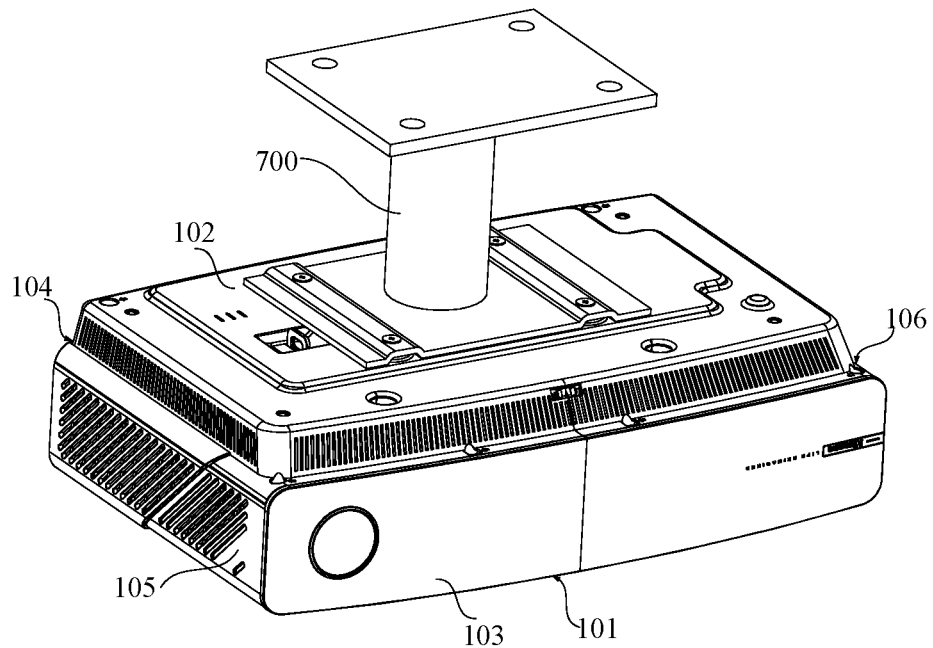
FIG. 5D is a perspective view of another projector in accordance with some embodiments.

In some embodiments, as shown in FIG. 5D, the projector 10 further includes a bracket 700 connected to the shell 100. The bracket 700 is configured to fix or hang the projector 10 on a wall. Illustratively, the bracket 700 is connected to the lower shell 102 by a plurality of screws.

On this basis, as shown in FIGS. 5B and 5C, the lower shell 102 includes a plurality of lower shell threaded holes 1025. The bracket 700 is connected to the lower shell 102 through the cooperation of screws and the lower shell threaded holes 1025. For example, as shown in FIG. 5C, the lower shell 102 includes four lower shell threaded holes 1025 provided on the bottom plate 1021 (see FIG. 9C) of the lower shell 102, which are a first lower shell threaded hole 1025A, a second lower shell threaded hole 1025B, a third lower shell threaded hole 1025C and a fourth lower shell threaded hole 1025D respectively. The bracket 700 is connected to the bottom plate 1021 of the lower shell 102 through the cooperation of the screws and the corresponding lower shell threaded holes 1025.

In some embodiments, the lower shell 102 includes a plurality of bosses 1026. The bosses 1026 protrude to the outside of the projector 10. The lower shell threaded holes 1025 are formed inside the bosses 1026. The bosses 1026 are in a one-to-one correspondence to the lower shell threaded holes 1025. For example, as shown in FIG. 5C, the lower shell 102 includes four bosses 1026 provided on the bottom plate 1021, which are a first boss 1026A, a second boss 1026B, a third boss 1026C and a fourth boss 1026D respectively. The insides of the first boss 1026A, the second boss 1026B, the third boss 1026C and the fourth boss 1026D respectively form the first lower shell threaded hole 1025A, the second lower shell threaded hole 1025B, the third lower shell threaded hole 1025C and the fourth lower shell threaded hole 1025D.

The projector 10 provided by some embodiments of the present disclosure, as shown in FIGS. 5A and 5B, further includes an auxiliary positioning device 600. The auxiliary positioning device 600 includes a fixing plate 610 and a positioning rod 620. The fixing plate 610 is connected to the shell 100 of the projector 10, and the positioning rod 620 is connected to the fixing plate 610.

The present disclosure does not limit the number of the positioning rod(s) 620. For example, the number of the positioning rod(s) 620 may be one, two, or more than two. FIG. 5A shows two positioning rods 620, namely, a first positioning rod 620A and a second positioning rod 620B.

The present disclosure does not limit the arrangement of the fixing plate 610, and the fixing plate 610 may be connected with the upper shell 101, the lower shell 102, the front shell 103, the rear shell 104, the left shell 105 or the right shell 106. For example, as shown in FIG. 5A, the fixing plate 610 is connected to the lower shell 102 to facilitate the hiding of the auxiliary positioning device 600 and reduce the influence on the appearance of the projector 10.

The present disclosure does not limit the connection between the fixing plate 610 and the shell 100, and a connection between the positioning rods 620 and the fixing plate 610. For example, the fixing plate 610 is fixedly connected to the shell 100, and the positioning rods 620 are rotatably connected to the fixing plate 610.

In some embodiments, the fixing plate 610 includes a fixing plate body 611, a cover 612 (see FIG. 6B) provided at the rear of the fixing plate body 611, and fixing plate screws 613. The fixing plate body 611 is fixedly connected to the lower shell 102 by a plurality of fixing plate screws 613. Exemplarily, as shown in FIG. 5C, the fixing plate body 611 is fixedly connected to the bottom plate 1021 of the lower shell 102 by a first fixing plate screw 613A and a second fixing plate screw 613B.

On this basis, the fixing plate 610 includes a plurality of fixing plate through holes 614 provided on the fixing plate body 611. Each fixing plate screw 613 passes through a corresponding fixing plate through hole 614 and is threadedly connected to a corresponding lower shell threaded hole 1025. Illustratively, the fixing plate 610 includes two fixing plate through holes 614 provided on the fixing plate body 611, namely, a first fixing plate through hole 614A and a second fixing plate through hole 614B. A first fixing plate screw 613A and a second fixing plate screw 613B respectively pass through the first fixing plate through hole 614A and the second fixing plate through hole 614B to be threadedly connected to the corresponding lower shell threaded hole 1025. Thereby, the fixing plate body 611 is fixed on the bottom plate 1021 of the lower shell 102.

It is understandable that the lower shell threaded holes 1025 connected to the fixing plate screws 613 may be one or more of the lower shell threaded holes 1025 connected to the bracket 700, or may be other holes formed by re-opening on the lower shell 102.

Illustratively, the two lower shell threaded holes 1025 respectively connected with the first fixing plate screw 613A and the second fixing plate screw 613B are the first lower shell threaded hole 1025A and the second lower shell threaded hole 1025B. On this basis, the first boss 1026A and the second boss 1026B on the bottom plate 1021 are arranged close to the rear shell 104. Therefore, the first lower shell threaded hole 1025A and the second lower shell threaded hole 1025B formed respectively inside the first boss 1026A and the second boss 1026B are close to the rear shell 104. Thus, a small fixing plate 610 may be enough to extend to the rear of the projector 10.

Figure 6A:
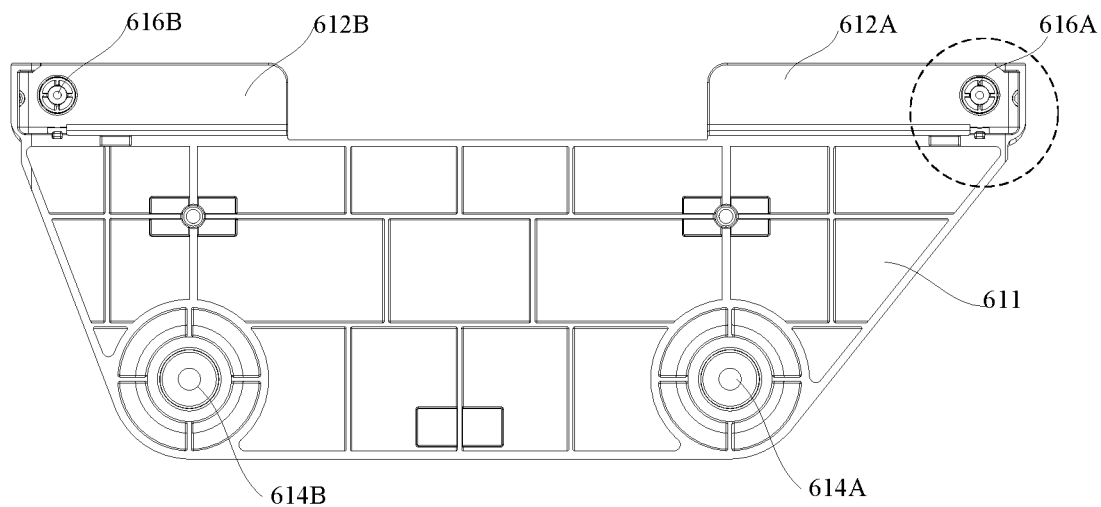
FIG. 6A is a bottom view of a fixing plate of a projector in accordance with some embodiments.
Figure 6B:
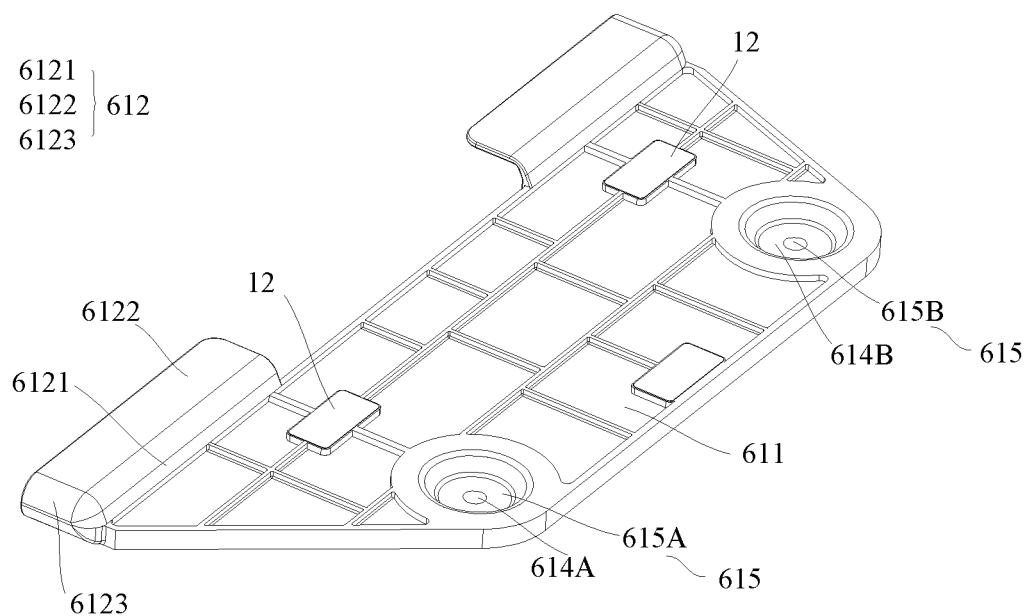
FIG. 6B is a perspective view of a fixing plate of a projector in accordance with some embodiments.

In some embodiments, as shown in FIG. 6B, the fixing plate 610 includes a plurality of protrusions 615 provided on the fixing plate body 611, and the protrusions 615 protrude far away from the lower shell 102. The fixing plate through holes 614 are formed inside the protrusions 615. The fixing plate through holes 614 are in a one-to-one correspondence to the protrusions 615. Illustratively, as shown in FIG. 6B, the fixing plate 610 includes two protrusions 615 provided on the fixing plate body 611, namely, a first protrusion 615A and a second protrusion 615B, respectively. In an inside of the first protrusion 615A and the second protrusion 615B there is the first fixing plate through hole 614A and the second fixing plate through hole 614B respectively.

Figure 8A:
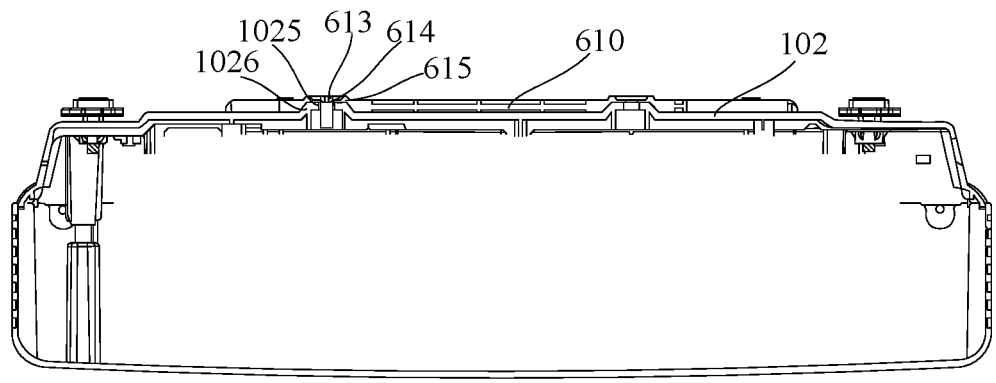
FIG. 8A is a diagram of a mounting structure of a fixing plate of a projector in accordance with some embodiments.
Figure 8B:
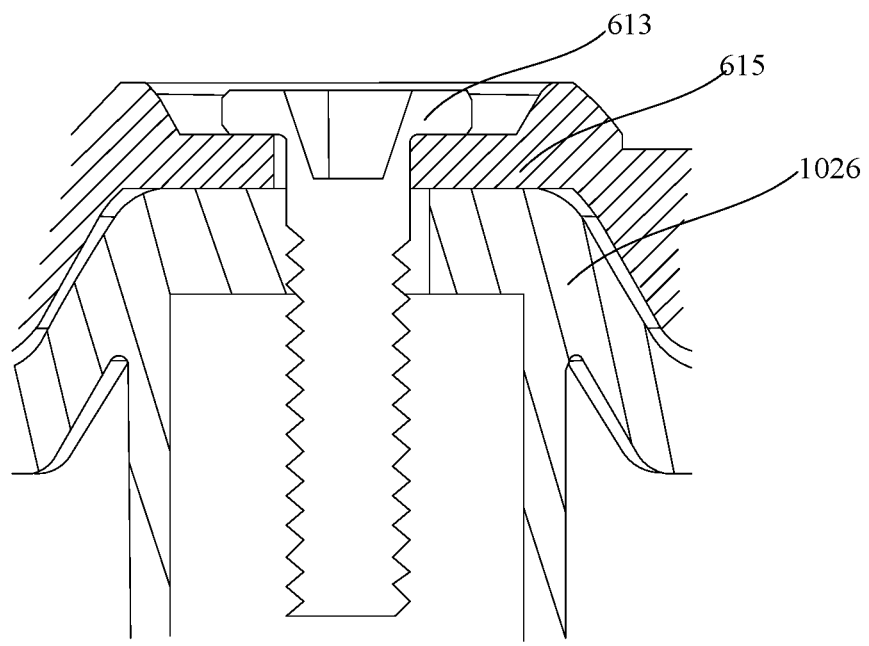
FIG. 8B is a partial enlarged view of FIG. 8A.

When the lower shell 102 includes a plurality of bosses 1026 and the fixing plate 610 includes a plurality of protrusions 615, as shown in FIGS. 8A to 8B, the protrusions 615 of the fixing plate 610 are nested on the corresponding bosses 1026 of the lower shell 102 after the lower shell 102 and the fixing plate 610 are installed, and the fixing plate through holes 614 correspond to the lower shell threaded holes 1025. The fixing plate screws 613 pass through the fixing plate through holes 614 and are threadedly connected with the lower shell threaded holes 1025. Meanwhile, bottom surfaces of screw caps of the fixing plate screws 613 are lower than bottom surfaces of the protrusions 615 of the fixing plate 610, so that the screw caps of the fixing plate screws 613 press and fix the fixing plate 610 to the lower shell 102.

In some embodiments, as shown in FIG. 6A, the fixing plate 610 includes connecting members 616. The positioning rods 620 are rotatably connected to the fixing plate 610 through the connecting members 616. Illustratively, the connecting members 616 are a rivet nut, such as a hot rivet nut.

It can be understood that the number of connecting members 616 is the same as the number of positioning rods 620. In the case where the auxiliary positioning device 600 includes two positioning rods 620, the fixing plate 610 includes two connecting members 616. At this time, the two positioning rods 620 are connected to the fixing plate 610 through the corresponding connecting members 616 respectively.

In the following description, that the auxiliary positioning device 600 includes a first positioning rod 620A and a second positioning rod 620B, and the fixing plate 610 includes a first connecting member 616A and a second connecting member 616B is as an example.

In some embodiments, the fixing plate 610 includes a plurality of covers 612. For example, as shown in FIGS. 6A to 6C, 7A and 7B, the fixing plate 610 includes two covers 612 arranged at the rear of the fixing plate body 611. The two covers 612 are a first cover 612A and a second cover 612B, respectively. After the fixing plate 610 and the lower shell 102 are installed, the fixing plate body 611 is located under the lower shell 102. The first cover 612A and the second cover 612B are located behind the rear shell 104, and both are bent upward.

The first cover 612A and the second cover 612B each includes a first wall 6121 substantially perpendicular to the fixing plate body 611, a second wall 6122 substantially parallel to the fixing plate body 611, and a side wall 6123 substantially perpendicular to the fixing plate body 611. The side wall 6123 connect the first wall 6121 and the second wall 6122. The first wall 6121 and the second wall 6122 of the first cover 612A extend along a direction perpendicular to the right shell 106 and far away from the right shell 106. The first wall 6121 and the second wall 6122 of the second cover 612B extend along a direction perpendicular to the left shell 105 and far away from the left shell 105. The side walls 6123 of the first cover 612A and the second cover 612B extend along a direction perpendicular to the rear shell 104 and far away from the rear shell 104.

The first connecting member 616A and the second connecting member 616B are respectively disposed on the second walls 6122 of the first cover 612A and the second cover 612B. The first connecting member 616A is located at an end of the second wall 6122 of the first cover 612A close to its side wall 6123. The second connecting member 616B is located at an end of the second wall 6122 of the second cover 612B close to its side wall 6123. The first positioning rod 620A is connected to the first cover 612A of the fixing plate 610 through the first connecting member 616A, and the second positioning rod 620B is connected to the second cover 612B of the fixing plate 610 through the second connecting member 616B.

In some embodiments, the fixing plate 610 includes one cover 612 disposed at the rear of the fixing plate body 611 (i.e., a part away from the fixing plate through holes 614). After the fixing plate 610 and the lower shell 102 are installed, the fixing plate body 611 is located below the lower shell 102. The cover 612 is located behind the rear shell 104 and is bent upward. For example, if the first cover 612A and the second cover 612B are respectively extended toward each other, and the two are combined into a complete whole, and then the cover 612 may be obtained.

The cover 612 includes a first wall 6121 substantially perpendicular to the fixing plate body 611, a second wall

6122 substantially parallel to the fixing plate body 611, and two side walls 6123 disposed oppositely and substantially perpendicular to the fixing plate body 611. Each side wall 6123 is connected to the first wall 6121 and the second wall 6122. The first wall 6121 and the second wall 6122 extend in a direction perpendicular to the left shell 105 and far away from the left shell 105, until reach the right shell 106. The two side walls 6123 extend in a direction perpendicular to the rear shell 104 and far away from the rear shell 104. At this time, the first connecting member 616A and the second connecting member 616B are respectively disposed on both ends of the second wall 6122 of the cover 612. The first positioning rod 620A and the second positioning rod 620B are respectively connected to the cover 612 of the fixing plate 610 by the first connecting member 616A and the second connecting member 616A.

In some embodiments, the fixing plate 610 does not include the cover(s) 612. In this case, the connecting members 616 are directly disposed on the fixing plate body 611. The positioning rods 620 are connected to the fixing plate body 611 through the connecting members 616.

Figure 6C:
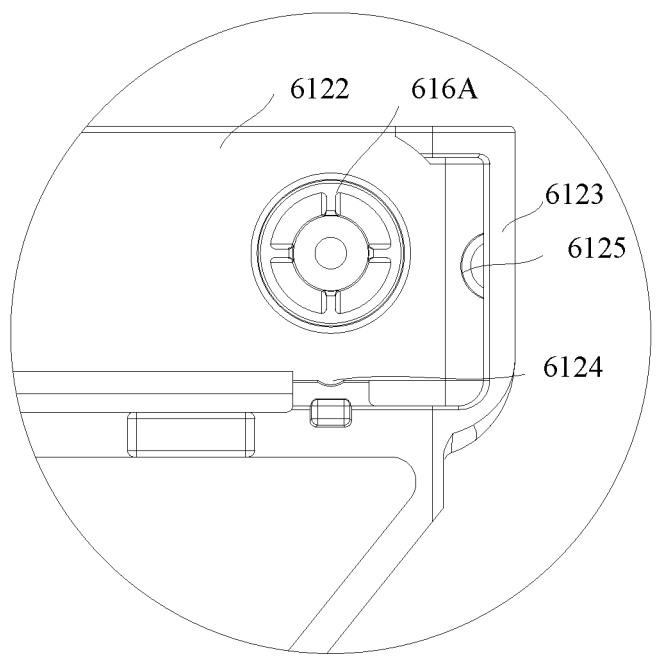
FIG. 6C is an enlarged view of a portion within a dashed circle of a fixing plate shown in FIG. 6A.
Figure 6D:
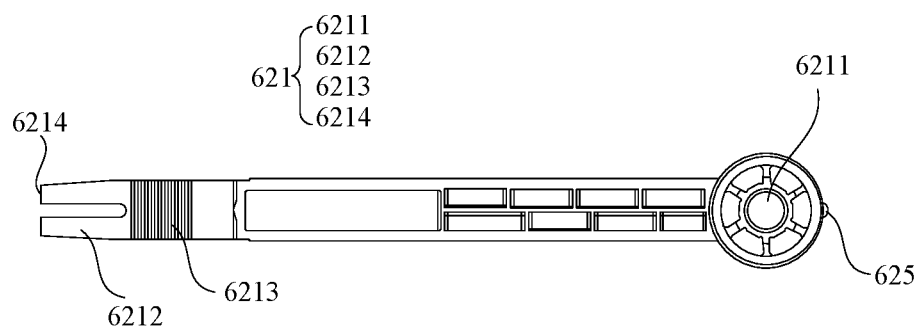
FIG. 6D is a structural diagram of a base rod of a projector in accordance with some embodiments.
Figure 6E:
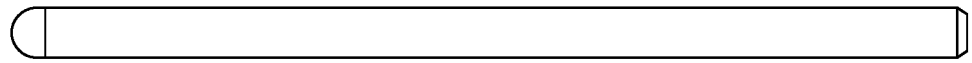
FIG. 6E is a structural diagram of a telescopic rod of a projector in accordance with some embodiments.

In some embodiments, as shown in FIG. 5C, the positioning rods 620 each includes a base rod 621, a telescopic rod 622, a locking nut 623 and a positioning rod fixing screw 624. The base rod 621 includes a first end and a second end opposite to the first end. The first end of the base rod 621 is connected to the fixing plate 610 through the cooperation of the positioning rod fixing screw 624 and the connecting member 616. On this basis, as shown in FIG. 6D, the base rod 621 includes a positioning rod fixing hole 6211 provided at the first end. The positioning rod fixing screw 624 passes through the positioning rod fixing hole 6211 and is threadedly connected to the connecting member 616. The base rod 621 may rotate around the positioning rod fixing screw 624, so that the positioning rod 620 may be adjusted in a positioning direction or a retracting direction. The second end of the base rod 621 is provided with an opening 6214. One end of the telescopic rod 622 is inserted into the base rod 621 through the opening 6214, and may move in the base rod 621. As shown in FIG. 6E, another end of the telescopic rod 622 that is not inserted into the base rod 621 is spherical.

It should be noted that the positioning direction refers to a direction substantially perpendicular to the rear shell 104 of the projector 10, and the retracting direction refers to a direction substantially perpendicular to the left shell 105 or the right shell 106 of the projector 10.

Figure 6F:
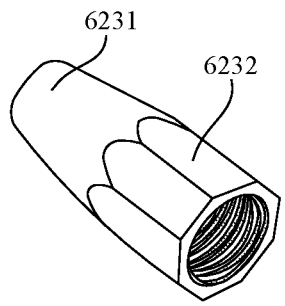
FIG. 6F is a structural diagram of a locking nut of a projector in accordance with some embodiments.

As shown in FIG. 6F, the locking nut 623 includes a locking portion 6231 and a threaded portion 6232. An inner diameter of a connecting portion where the locking portion 6231 and the threaded portion 6232 are connected is the same as an inner diameter of the threaded portion 6232. An inner diameter of an end of the locking portion 6231 away from the threaded portion 6232 is smaller than the inner diameter of the threaded portion 6232. The inner diameter of the locking portion 6231 decreases from the connection portion where the locking portion 6231 is connected with the threaded portion 6232 to the end away from the threaded portion 6232. Correspondingly, the base rod 621 includes a fork portion 6212 and a threaded portion 6213 provided at the second end. An outer diameter of a connecting portion where the fork portion 6212 and the thread portion 6213 are connected is the same as an outer diameter of the thread portion 6213. An outer diameter of an end of the fork portion 6212 away from the thread portion 6213 is smaller than the outer diameter of the thread portion 6213. The outer diameter of the fork portion 6212 decreases from the connection portion where the fork portion 6212 is connected with the threaded portion 6213 to the end away from the threaded portion 6213.

The locking nut 623 is sleeved on an outer circumference of the base rod 621 and may be rotatably locked with the threaded portion 6213 of the base rod 621. As the locking nut 623 is screwed in, the locking portion 6231 of the locking nut 623 gradually compresses the fork portion 6212 of the base rod 621, and then compresses the telescopic rod 622 that goes inside the base rod 621. Therefore, the telescopic rod 622 may be fixed, and the movement of the telescopic rod 622 inside the base rod 621 may be limited, and in turn the length of the entire positioning rod 620 may be fixed.

In some embodiments, the positioning rod 620 includes more than one telescopic rod 622, for example, there may be two or more telescopic rods 622. A first telescopic rod 622 goes into the base rod 621. A second telescopic rod 622 goes into the first telescopic rod 622, and a third telescopic rod 622 goes into the second telescopic rod 622, and so on. In other words, if there are first to (N)th telescopic rods (N is a natural number and equal to or greater than 2), the first to (N)th telescopic rods satisfy a relation: the (n)th telescopic rod goes into the (n−1)th telescopic rod (n=2, 3, . . . , N−1, and N). In this way, the length of the positioning rods 620 when they are extended may be increased, and, the length of the base rod 621 and each telescopic rod 622 may be reduced, thereby reducing the length of the positioning rod 620 when it is retracted.

In some embodiments, as shown in FIG. 6D, the positioning rods 620 each includes a limiting protrusion 625. As shown in FIG. 6C, the cover 612 includes a positioning limiting portion 6124 and a retracting limiting portion 6125. The positioning limiting portion 6124 is configured to cooperate with the limiting protrusion 625 to restrict the positioning rod 620 in the positioning direction. The retracting limiting portion 6125 is configured to cooperate with the limiting protrusion 625 to restrict the positioning rod 620 in the retracting direction.

The following considers the first positioning rod 620A and the first cover 612A as an example to describe the arrangement mode and principle of the limiting protrusion 625, the positioning limiting portion 6124 and the retracting limiting portion 6125.

For example, as shown in FIG. 5C, the first positioning rod 620A includes the limiting protrusion 625 arranged on an outer circumference of the positioning rod fixing hole 6211 along an axial direction of the base rod 621. As shown in FIG. 6C, the first cover 612A includes the positioning limiting portion 6124 provided on the first wall 6121. Illustratively, the positioning limiting portion 6124 is a recess which is in cooperation with the limiting protrusion 625. When the first positioning rod 620A rotates to the positioning direction, the limiting protrusion 625 is embedded in the recess. An edge of the recess may restrict the rotation of the limiting protrusion 625, thereby restricting the first positioning rod 620A in the positioning direction to achieve more accurate positioning. In addition, in a case there is an external force, the limiting protrusion 625 of the first positioning rod 620A may escape from the recess and rotate freely again.

Figure 7A:
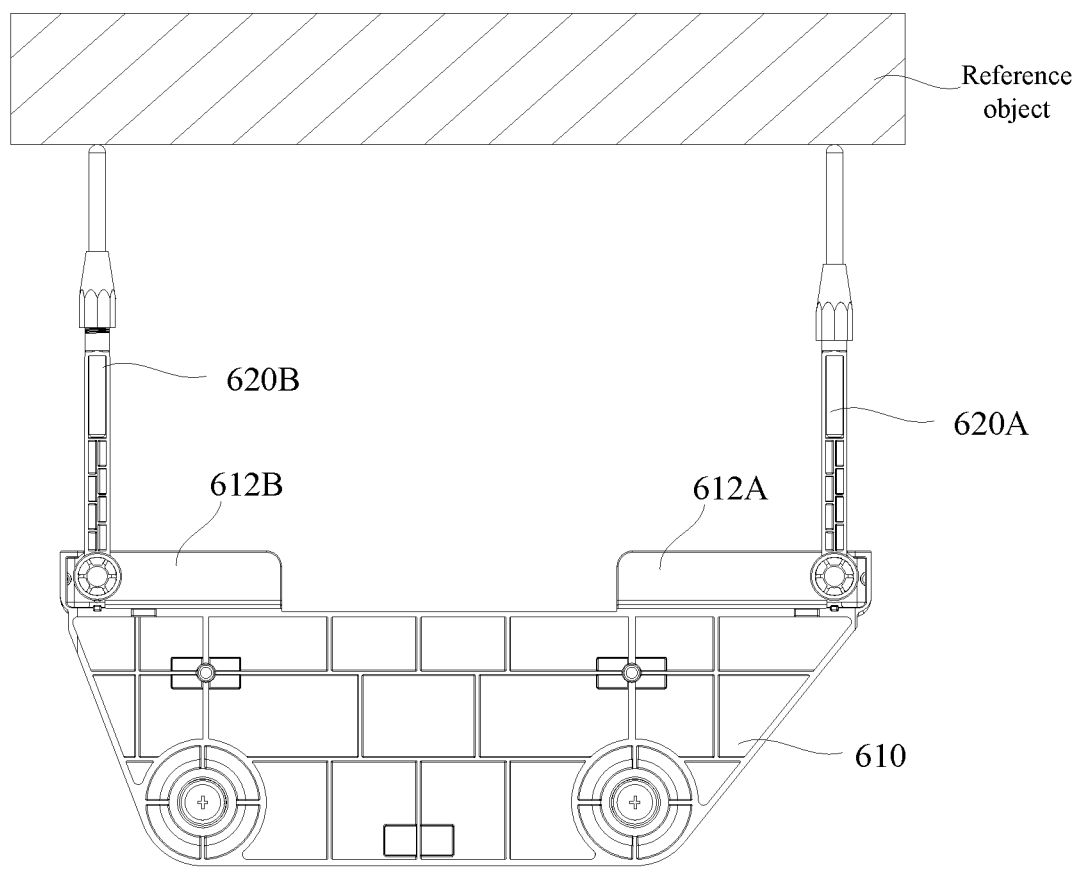
FIG. 7A is a schematic diagram of a positioning direction of an auxiliary positioning device of a projector in accordance with some embodiments.
Figure 7B:
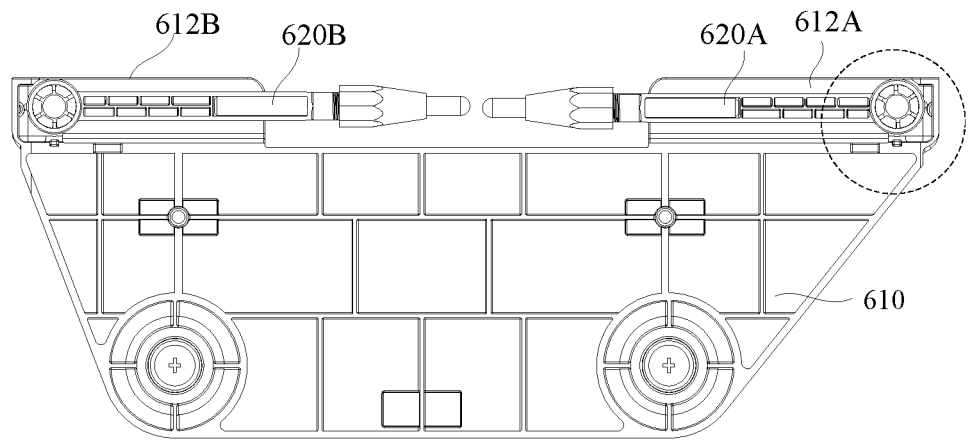
FIG. 7B is a schematic view of a retracting direction of an auxiliary positioning device of a projector in accordance with some embodiments.
Figure 7C:
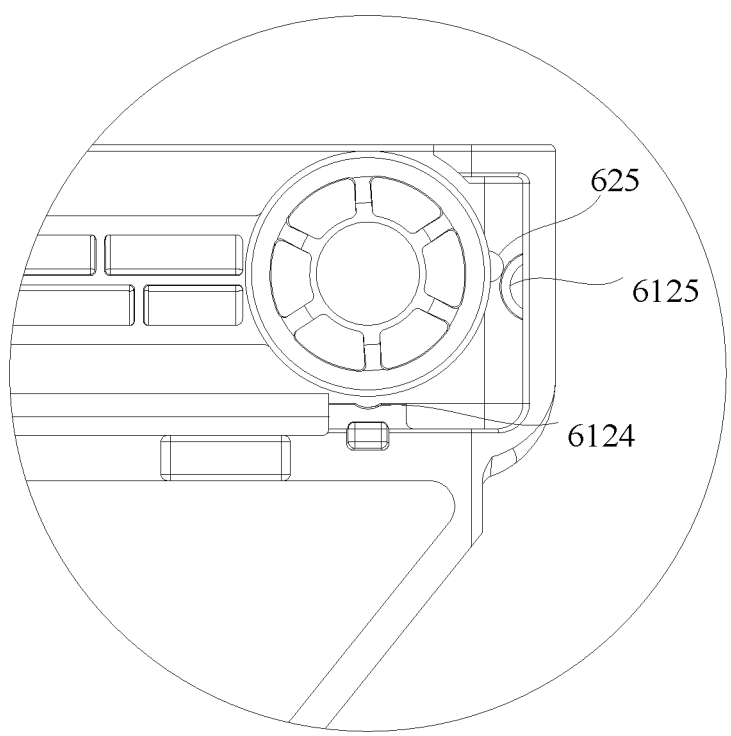
FIG. 7C is an enlarged view of a portion within a dashed circle of an auxiliary positioning device shown in FIG. 7B.

The first cover 612A further includes a retracting limiting portion 6125 provided on the side wall 6123. For example, the retracting limiting portion 6125 is a protrusion or a recess which is in cooperation with the limiting protrusion 625. As shown in FIG. 6C, the retracting limiting portion 6125 is a protrusion provided in cooperation with the limiting protrusion 625. When the first positioning rod 620A rotates to the retracting direction, an edge of the protrusion (for example, as shown in FIGS. 7B and 7C, an upper half edge of the protrusion) may restrict the rotation of the limiting protrusion 625 to the positioning direction, thereby limiting the rotation of the first positioning rod 620A, and restricting the first positioning rod 620A from freely rotating out of the retracting direction. It is avoided that the first positioning rod 620A is easily opened, which otherwise affects the visual effect of the projector 10. The first positioning rod 620A can be opened under an artificial external force during use. In addition, a contact area between the protrusion and the limiting protrusion 625 is small, and a small external force may be artificially applied to make the positioning rod 620 rotate from the retracting direction to the positioning direction, which is convenient for operation.

In some embodiments, in order to avoid possible vibrations caused by such as working of a fan during the operation of the projector 10, and to avoid causing noise between the lower shell 102 and the fixing plate 610 due to the vibrations and collisions, the projector 10 also includes a flexible gasket 12 disposed between the bottom plate 1021 of the shell 102 and the fixing plate body 611. The flexible gasket 12 is pasted on a side of the bottom plate 1021 close to the fixing plate body 611 or a side of the fixing plate body 611 close to the bottom plate 1021. Illustratively, the flexible gasket 12 may be a rubber sheet.

As shown in FIG. 6B, the flexible gaskets 12 are pasted on the side of the fixing plate body 611 close to the bottom plate 1021, and are located at the rear of the first fixing plate through hole 614A and the second fixing plate through hole 614B. Through the cushioning of the rubber sheet, the noise caused by vibrations is reduced. In addition, pressing a front side of the fixing plate 610 (that is, a side of the fixing plate 610 with the first fixing plate through hole 614A and the second fixing plate through hole 614B) tightly against the bottom plate 1021 of the lower shell 102 may also reduce the noise caused by vibrations.

In some embodiments, the lower shell 102 includes a plurality of adjustable anchor bolts 1027 arranged on the bottom plate 1021, and the adjustable anchor bolts 1027 may extend from the bottom plate 1021 to the outside of the projector 10, thereby adjusting the height of the projector 10. For example, as shown in FIG. 5B, the lower shell 102 includes four adjustable anchor bolts 1027, which are respectively a first adjustable anchor bolt 1027A, a second adjustable anchor bolt 1027B, a third adjustable anchor bolt 1027C and a fourth adjustable anchor bolt 1027D. The bottom ends of the adjustable anchor bolts 1027 at the minimum extension are lower than bottom surfaces of the protrusions 615 of the fixing plate 610.

In some embodiments, as shown in FIGS. 5A and 5B, a distance between the second positioning rod 620B on the left and the left shell 105 of the projector 10 is not equal to a distance between the first positioning rod 620A on the right and the right shell 106 of the projector 10. The shell 100 includes a socket 110 provided on the rear shell 104. In order to facilitate the operation of inserting a plug into the socket 110, the first positioning rod 620A and the second positioning rod 620B take evasive action.

In some embodiments, the distance between the second positioning rod 620B on the left and the left shell 105 of the projector 10 is greater than the distance between the first positioning rod 620A on the right and the right shell 106 of the projector 10. The socket 110 is provided on the left side of the rear shell 104, and the second positioning rod 620B on the left side is avoided from the socket 110.

In some embodiments, as shown in FIG. 9A to 9F, the fixing plate 610 is not necessary, and the auxiliary positioning device 600 only includes the positioning rod 620. At this time, the positioning rod 620 is connected to the shell 100, and the length of the positioning rod 620 is adjustable.

The present disclosure does not limit the number of the positioning rod(s) 620. For example, the number of the positioning rod(s) 620 may be one, two, or more than two. FIG. 9A shows two positioning rods 620, namely, a first positioning rod 620A and a second positioning rod 620B.

The present disclosure does not limit the arrangement of the positioning rods 620, and they may be connected to the upper shell 101, the lower shell 102, the front shell 103, the rear shell 104, the left shell 105 or the right shell 106. For example, as shown in FIG. 9A, the positioning rods 620 are connected to the lower shell 102 to facilitate the concealment of the auxiliary positioning device 600 and reduce the influence on the appearance of the projector 10.

The present disclosure does not limit the connection manner between the positioning rods 620 and the shell 100. The positioning rods 620 and the shell 100 may be fixedly connected or rotationally connected. Illustratively, the positioning rods 620 are hinged to the shell 100.

In some embodiments, the lower shell 102 includes connecting members 616, and the positioning rods 620 are rotatably connected with the lower shell 102 through the connecting members 616. Illustratively, the connecting members 616 are a rivet nut, such as a hot rivet nut.

It can be understood that the number of connecting members 616 is the same as the number of positioning rods 620. In the case where the auxiliary positioning device 600 includes two positioning rods 620, the lower shell 102 includes two connecting members 616. At this time, the two positioning rods 620 are respectively connected to the lower shell 102 through corresponding connecting members 616.

In the following description, that the auxiliary positioning device 600 includes a first positioning rod 620A and a second positioning rod 620B, and the lower shell 102 includes a first connecting member 616A and a second connecting member 616B is as an example.

Figure 9D:
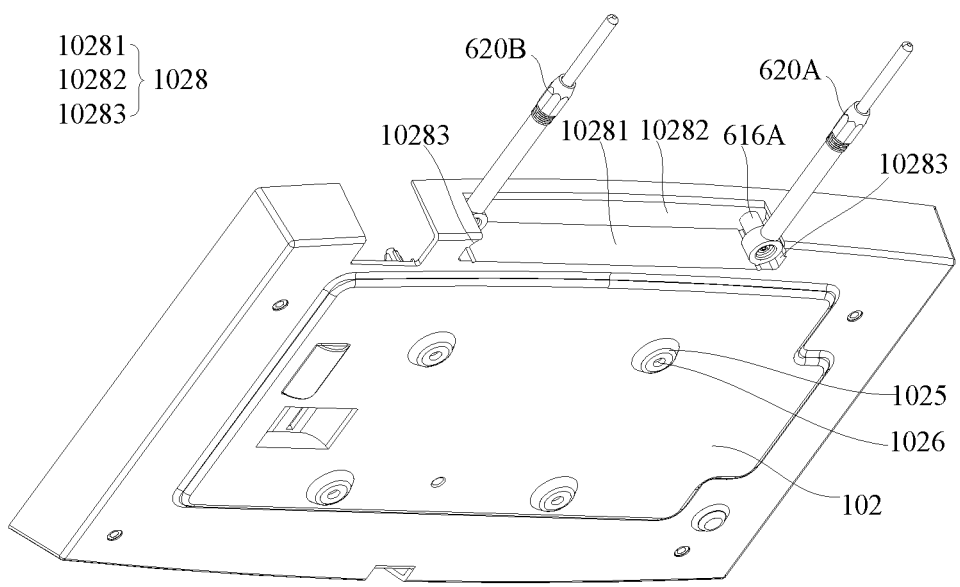
FIG. 9D is a perspective view of an auxiliary positioning device of a projector in the positioning direction shown in FIG. 9A.
Figure 9E:
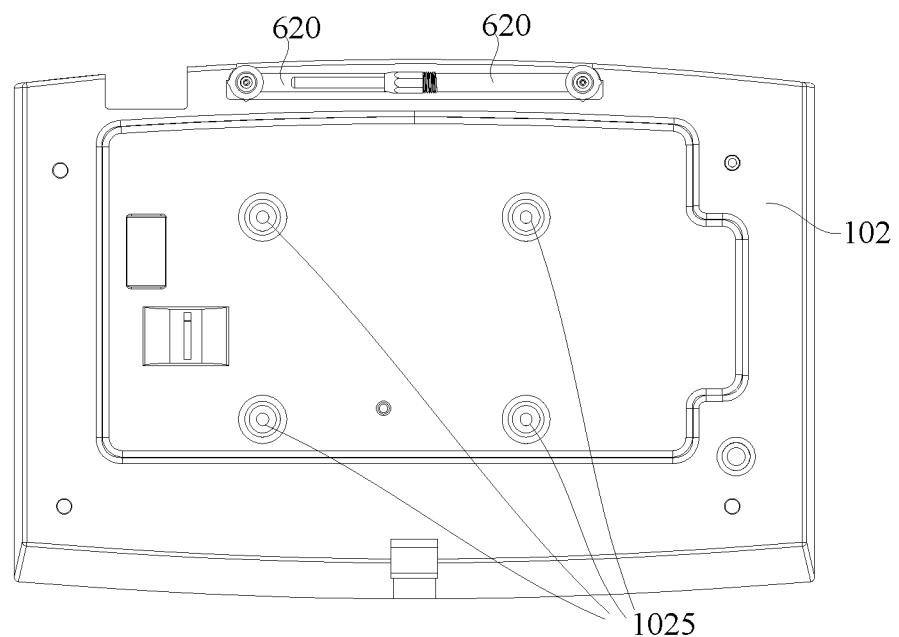
FIG. 9E is a bottom view of an auxiliary positioning device of a projector in the retracting direction shown in FIG. 9A.
Figure 9F:
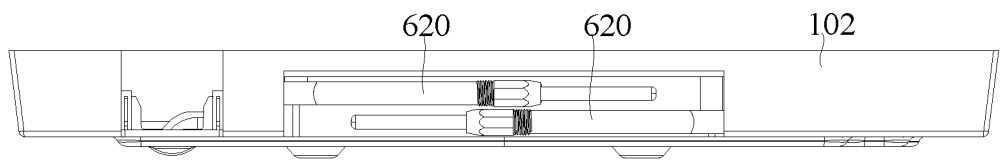
FIG. 9F is a rear view of an auxiliary positioning device of a projector in the retracting direction shown in FIG. 9A.

In some embodiments, as shown in FIGS. 9A and 9D, the lower shell 102 includes a groove 1028 disposed on the back plate 1023 and recessed into the projector 10. The groove 1028 includes a first plane 10281 substantially perpendicular to the bottom plate 1021, a second plane 10282 substantially parallel to the bottom plate 1021 and two side surfaces 10283 disposed oppositely and substantially perpendicular to the bottom plate 1021. The first plane 10281 and the second plane 10282 extend in a direction perpendicular to the left shell 105 and away from the left shell 105, and stop before reaching the right shell 106. The two side surfaces 10283 extend in a direction perpendicular to the rear shell 104 toward the interior of the projector 10. At this time, the first connecting member 616A and the second connecting member 616B are respectively arranged at both ends of the second plane 10282 of the groove 1028. The first positioning rod 620A and the second positioning rod 620B are connected to the lower shell 102 respectively through the first connecting member 616A and the second connecting member 616B.

It should be noted that the structure of the positioning rods 620 have been described above, and will not be repeated here.

In some embodiments, the positioning rods 620 each includes a limiting protrusion 625. The groove 1028 includes a positioning limiting portion 6124 and a retracting limiting portion 6125. The positioning limiting portion 6124 is configured to cooperate with the limiting protrusion 625 to limit the positioning rods 620 in the positioning direction. The retracting limiting portion 6125 is configured to cooperate with the limiting protrusion 625 to limit the positioning rods 620 in the retracting direction.

The following considers the first positioning rod 620A as an example to describe the arrangement mode and principle of the limiting protrusion, the positioning limiting portion 6124 and the retracting limiting portion 6125.

Figure 9G:
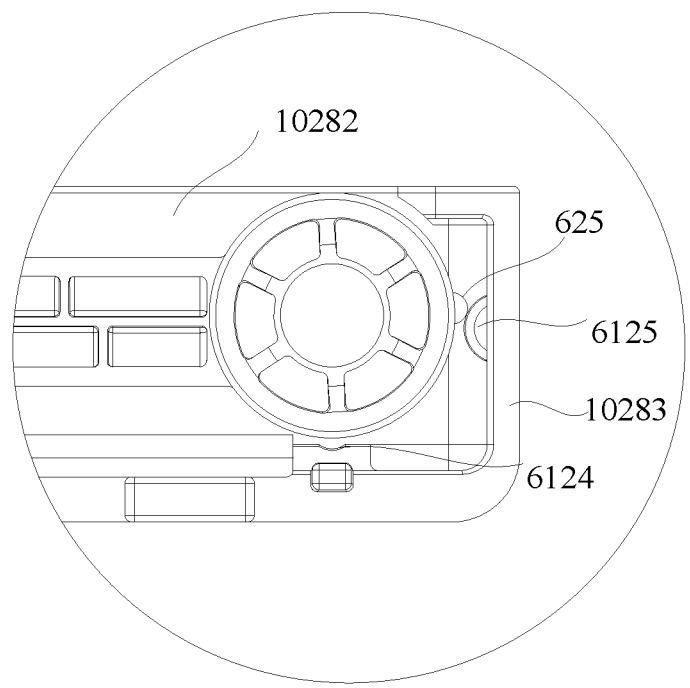
FIG. 9G is a partial enlarged view of an auxiliary positioning device of a projector shown in FIG. 9D.

For example, as shown in FIG. 9G, the first positioning rod 620A includes a limiting protrusion 625 disposed on an outer circumference of the positioning rod fixing hole 6211 along an axial direction of the base rod 621. The groove 1028 includes the positioning limit portion 6124 on the first plane 10281. Illustratively, the positioning limiting portion 6124 is a recess which is in cooperation with the limiting protrusion 625. When the first positioning rod 620A rotates to the positioning direction, the limiting protrusion 625 is embedded in the recess. An edge of the recess may restrict the rotation of the limiting protrusion 625, thereby restricting the first positioning rod 620A in the positioning direction to achieve more accurate positioning. In a case there is an external force, the limiting protrusion 625 of the first positioning rod 620A may escape from the recess and rotate freely again.

The groove 1028 includes a retracting limiting portion 6125 provided on each of the side surfaces 10283. For example, the retracting limiting portion 6125 is a protrusion or a recess which is in cooperation with the limiting protrusion 625. As shown in FIG. 9G, the retracting limiting portion 6125 is a protrusion provided in cooperation with the limiting protrusion 625. When the first positioning rod 620A rotates to the retracting direction, the edge of the protrusion (for example, as shown in FIG. 9G, an upper half edge of the protrusion) may restrict the rotation of the limiting protrusion 625 to the positioning direction, thereby limiting the rotation of the first positioning rod 620A, and restricting the first positioning rod 620A from freely rotating out of the retracting direction. It is avoided that the first positioning rod 620A is easily opened, which otherwise affects the visual effect of the projector 10. The first positioning rod 620A can be opened under an artificial external force during use. In addition, a contact area between the protrusion and the limiting protrusion 625 is small, and a small external force may be artificially applied to make the positioning rod 620 rotate from the retracting direction to the positioning direction, which is convenient for operation.

In some embodiments, the lower shell 102 includes a plurality of adjustable anchor bolts 1027 arranged on the bottom plate 1021, and the adjustable anchor bolts 1027 may extend from the bottom plate 1021 to the outside of the projector 10, thereby adjusting the height of the projector 10. For example, as shown in FIG. 9B, the lower shell 102 includes four adjustable anchor bolts 1027, which are respectively a first adjustable anchor bolt 1027A, a second adjustable anchor bolt 1027B, a third adjustable anchor bolt 1027C and a fourth adjustable anchor bolt 1027D.

In some embodiments, the bottom ends of the adjustable anchor bolts 1027 at the minimum extension are lower than the bottom surface of the positioning rods 620.

After the projector 10 is installed for the first time, a professional installer may position the projector 10 to find a suitable projector position, so that the projector 10 may accurately project on a wall or a screen fixed on the wall. After the position of the projector is fixed, the positioning rods 620 may be extended to the rear of the projector to the positioning direction, and the length of the positioning rods 620 may be adjusted without moving the projector 10 so that the positioning rods 620 abut against a reference object. The reference object is, for example, another wall opposite to the wall or screen where the image is projected. The length of the positioning rods is locked, and meanwhile, the abutting positions of the positioning rods 620 are marked on the reference object. After the marking is completed, the positioning rods 620 are retracted.

Afterwards, if the projector 10 is accidentally shifted, the positioning rods 620 are opened to the positioning direction and extended to the locked length. Without changing the length of the positioning rods that has been adjusted, the projector 10 is moved so that the positioning rods 620 abut against the abutting positions marked on the reference object. The positioning of the projector 10 may then be realized.

Figure 10:
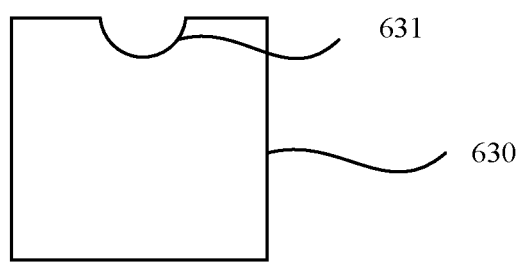
FIG. 10 is a structural diagram of a positioning label of a projector in accordance with some embodiments.

By adjusting the length of the above-mentioned retracted positioning rods 620 to abut against the reference object in the positioning direction, and then locking the length of the positioning rods 620, the distance between the projector 10 and the reference object is recorded. In addition, the abutting positions of the positioning rods 620 are marked on the reference object. Therefore, the position of the projector 10 may be easily reset by the positioning rods 620 according to the abutting positions and the locked length in the future. For example, a positioning label 630 as shown in FIG. 10 may be used to stick on a wall to perform marking positioning.

In some embodiments, the positioning label 630 has a notch 631. When the positioning label 630 is glued to the reference object, the spherical end of the telescopic rod 622 of the positioning rod 620 that is not inserted into the base rod 621 may be located in the opening 631, so as to mark the position more accurately.

The projector provided by some embodiments of the present disclosure has an auxiliary positioning device, through which the rapid recovery positioning of the projector 10 itself may be realized, and it has a good auxiliary for the rapid recovery positioning of the ultra-short-throw projector whose position is not fixed. However, the projectors provided by some embodiments of the present disclosure are not limited to only ultra-short-throw projectors, and may also be other projectors, such as long-throw projectors, short-throw projectors, etc., under the same or similar working principles.

The foregoing descriptions are merely specific implementations of the present disclosure, but the protection scope of the present disclosure is not limited thereto. Any changes or replacements that a person skilled in the art could conceive of within the technical scope of the present disclosure shall be included in the protection scope of the present disclosure. Therefore, the scope of the present disclosure shall be subject to the protection scope of the claims.

What is claimed is:

1. A projector, comprising:
  a shell;
  a light source arranged inside the shell and configured to provide illumination beams;
  an optical engine arranged inside the shell and connected to the light source, and configured to modulate the illumination beams based on received image signals to obtain projection beams;
  a projection lens arranged inside the shell and connected to the optical engine, and configured to project the projection beams on a projection plane for imaging;
  an auxiliary positioning device connected to the shell and configured to locate a position of the projector; and
  a connecting member; wherein the auxiliary positioning device includes: a positioning rod including a first end and a second end opposite to the first end;

the first end of the positioning rod is connected with the shell, the second end of the positioning rod is configured to abut against a reference object which is at a fixed position relative to the projection plane;

the positioning rod includes a positioning rod fixing screw, and a positioning rod fixing hole provided at the first end of the positioning rod;

the positioning rod fixing screw passes through the positioning rod fixing hole and is connected to the connecting member, so that the first end of the positioning rod is connected to the shell through the positioning rod fixing screw and the connecting member; and the positioning rod fixing hole is in clearance fit with the connecting member, so that the positioning rod is configured to rotate around the connecting member.

2. The projector according to claim 1, wherein the connecting member comprises a rivet nut.

3. The projector according to claim 1, wherein the auxiliary positioning device further comprises a fixing plate, and the fixing plate is connected with the shell; and the first end of the positioning rod is connected to the fixing plate through the connecting member.

4. The projector according to claim 3, wherein the fixing plate includes a fixing plate body, a fixing plate screw, and a fixing plate through hole provided on the fixing plate body;

the shell includes a threaded hole; and the fixing plate screw passes through the fixing plate through hole and is connected to the threaded hole, so that the fixing plate is connected to the shell.

5. The projector according to claim 4, wherein the shell includes a boss protruding to the outside of the projector, and the threaded hole is disposed inside the boss;

the fixing plate includes a protrusion protruding to the outside of the projector, and the fixing plate through hole is disposed inside the protrusion; and the protrusion is nested on the boss, and the fixing plate through hole corresponds to the threaded hole.

6. The projector according to claim 4, wherein the fixing plate further comprises a flexible gasket located on a surface of the fixing plate body close to the shell.

7. The projector according to claim 4, wherein the fixing plate further includes a cover arranged on a side of the fixing plate body away from the fixing plate through hole;

the cover includes a first wall that is substantially perpendicular to the fixing plate body, a second wall that is substantially parallel to the fixing plate body, and a side wall that is substantially perpendicular to the fixing plate body and connected to the first wall and the second wall; the connecting member is arranged on the second wall of the cover.

8. The projector according to claim 7, wherein the shell includes an upper shell and a lower shell which are arranged oppositely, a front shell and a rear shell which are arranged oppositely, and a left shell and a right shell which are arranged oppositely;

the positioning rod includes a limiting protrusion arranged on an outer circumference of the positioning rod fixing hole along an axial direction of the positioning rod, and the cover includes a positioning limiting portion provided on the first wall and a retracting limiting portion on the side wall; and the positioning limiting portion is configured to cooperate with the limiting protrusion to limit the positioning rod in a positioning direction, and the retracting limiting portion is configured to cooperate with the limiting protrusion to limit the positioning rod in a retracting direction; wherein, the positioning direction is substantially perpendicular to the rear shell, and the retracting direction is substantially perpendicular to the left shell.

9. The projector of claim 8, wherein the positioning limiting portion is a recess, and the retracting limiting portion is a protrusion.

10. The projector according to claim 1, wherein the shell includes an upper shell and a lower shell that are opposed to each other, a front shell and a rear shell that are opposed to each other, and, a left shell and a right shell that are opposed to each other;

the lower shell includes a bottom plate, a front plate and a back plate arranged oppositely, and two side plates arranged oppositely; the front plate is located under the front shell, and the back plate is located under the rear shell; the lower shell further includes a groove provided on the back plate and recessed into the projector; and the groove includes a first plane that is substantially perpendicular to the bottom plate, a second plane that is substantially parallel to the bottom plate, and two opposite side surfaces that are substantially perpendicular to the bottom plate; the connecting member is disposed on the second plane of the groove.

11. The projector according to claim 10, wherein the positioning rod includes a limiting protrusion arranged on the outer circumference of the positioning rod fixing hole along an axial direction of the positioning rod; the groove includes a positioning limiting portion provided on the first plane and a retracting limiting portion on a side face; and the positioning limiting portion is configured to cooperate with the limiting protrusion to limit the positioning rod in a positioning direction, and the retracting limiting portion is configured to cooperate with the limiting protrusion to limit the positioning rod in a retracting direction; wherein, the positioning direction is substantially perpendicular to the rear shell, and the retracting direction is substantially perpendicular to the left shell.

12. The projector of claim 11, wherein the positioning limiting portion is a recess, and the retracting limiting portion is a protrusion.

13. A projector, comprising:

a shell;

a light source arranged inside the shell and configured to provide illumination beams;

an optical engine arranged inside the shell and connected to the light source, and configured to modulate the illumination beams based on received image signals to obtain projection beams;

a projection lens arranged inside the shell and connected to the optical engine, and configured to project the projection beams on a projection plane for imaging; and an auxiliary positioning device connected to the shell and configured to locate a position of the projector; wherein the auxiliary positioning device includes: a positioning rod including a first end and a second end opposite to the first end;

the first end of the positioning rod is connected with the shell, the second end of the positioning rod is configured to abut against a reference object which is at a fixed position relative to the projection plane;

the positioning rod comprises a base rod, first to (N)th telescopic rods, and first to (N)th locking nuts, in which N is a natural number and equal to or greater than 2;

the first telescopic rod is disposed in the base rod, and the first to (N)th telescopic rods satisfy a relation: the (n)th telescopic rod is disposed in the (n−1)th telescopic rod (n=2, 3, . . . , N−1 and N); and the first locking nut is configured to lock a connection portion where the base rod and the first telescopic rod are connected, and the second to (N)th locking nuts and the first to (N)th telescopic rods satisfy a relation: the (n)th locking nut is configured to lock a connecting portion where the (n−1)th telescopic rod and the (n)th telescopic rod are connected (n−2, 3, . . . , N−1, and N).

14. The projector according to claim 13, wherein the locking nut includes a locking portion and a first threaded portion, and the base rod includes a fork portion and a second threaded portion which are provided at the second end of the base rod; and the locking nut is sleeved on an outer circumference of the base rod, and the first threaded portion of the locking nut and the second threaded portion of the base rod are matched and locked, so that the locking portion press the fork portion on the telescopic rod, in turn the base rod and the telescopic rod are locked.

15. The projector according to claim 14, wherein an inner diameter of a connection portion where the locking portion and the first threaded portion are connected is equal to an inner diameter of the first threaded portion, and an inner diameter of an end of the locking portion away from the first threaded portion is smaller than the inner diameter of the first threaded portion; and an outer diameter of a connection portion where the fork portion and the second threaded portion are connected is equal to an outer diameter of the second threaded portion, and an outer diameter of an end of the fork portion away from the second threaded portion is smaller than the outer diameter of the second threaded portion.

16. The projector according to claim 14, wherein the positioning rod comprises a base rod, a telescopic rod, and a locking nut;

a first end of the base rod is provided with a positioning rod fixing hole; the first end of the base rod is connected to the shell through the positioning rod fixing hole;

a second end of the base rod is provided with an opening, a first end of the telescopic rod goes into an interior of the base rod through the opening, and a second end of the telescopic rod is configured to abut against a reference object that is at a fixed position relative to the projection plane; and the locking nut is configured to lock a connection portion where the base rod and the telescopic rod are connected.

17. A projector, comprising:

a shell;

a light source arranged inside the shell and configured to provide illumination beams;

an optical engine arranged inside the shell and connected to the light source, and configured to modulate the illumination beams based on received image signals to obtain projection beams;

a projection lens arranged inside the shell and connected to the optical engine, and configured to project the projection beams on a projection plane for imaging; and an auxiliary positioning device connected to the shell and configured to locate a position of the projector; wherein the auxiliary positioning device includes: a positioning rod including a first end and a second end opposite to the first end;

the first end of the positioning rod is connected with the shell, the second end of the positioning rod is configured to abut against a reference object which is at a fixed position relative to the projection plane;

the auxiliary positioning device further comprises a positioning label configured to mark a position where the positioning rod abuts against the reference object; and the positioning label includes a notch configured to receive the second end of the positioning rod.

18. The projector according to claim 17, wherein the positioning rod comprises a positioning rod fixing screw, and a positioning rod fixing hole provided at the first end of the positioning rod; and the positioning rod fixing screw passes through the positioning rod fixing hole and is connected to the shell.

* * * * *